(12) United States Patent
Jin et al.

(10) Patent No.: US 11,394,278 B2
(45) Date of Patent: Jul. 19, 2022

(54) SHUNT WOUND DC MOTOR DRIVING DEVICE AND ELECTRICAL EQUIPMENT

(71) Applicant: UNIVERSITY OF SHANGHAI FOR SCIENCE AND TECHNOLOGY, Shanghai (CN)

(72) Inventors: Aijuan Jin, Shanghai (CN); Shaolong Li, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 17/296,242

(22) PCT Filed: Feb. 1, 2019

(86) PCT No.: PCT/CN2019/074395
§ 371 (c)(1),
(2) Date: May 23, 2021

(87) PCT Pub. No.: WO2020/133637
PCT Pub. Date: Jul. 2, 2020

(65) Prior Publication Data
US 2022/0021282 A1    Jan. 20, 2022

(30) Foreign Application Priority Data

Dec. 29, 2018 (CN) .......................... 201811643901.7
Dec. 29, 2018 (CN) .......................... 201811654423.X
(Continued)

(51) Int. Cl.
*H02K 1/14* (2006.01)
*H02K 1/26* (2006.01)
(Continued)

(52) U.S. Cl.
CPC ............... *H02K 11/33* (2016.01); *H02K 1/14* (2013.01); *H02K 1/26* (2013.01); *H02K 5/225* (2013.01); *H02K 23/06* (2013.01)

(58) Field of Classification Search
CPC .. H02K 1/14; H02K 1/26; H02K 3/18; H02K 3/28; H02K 11/33; H02K 11/38;
(Continued)

(56) References Cited

U.S. PATENT DOCUMENTS

2007/0247014 A1* 10/2007 Schach ..................... H02P 7/12
310/184
2021/0210997 A1* 7/2021 Li ........................ H02K 23/06
(Continued)

FOREIGN PATENT DOCUMENTS

| CN | 102412777 A | 4/2012 |
| CN | 106899245 A | 6/2017 |

(Continued)

OTHER PUBLICATIONS

International Search Report in PCT/CN2019/074395, issued by ISA, dated Aug. 22, 2019.
(Continued)

*Primary Examiner* — Eric Johnson
(74) *Attorney, Agent, or Firm* — Zhu Lehnhoff LLP

(57) ABSTRACT

The present invention provides a shunt wound direct-current (DC) motor driving device and electrical equipment. The shunt wound DC motor driving device provided by the present invention includes a shunt wound DC motor, a DC power supply, and a chopper that converts a constant voltage into a variable voltage based on a control signal and provides the variable voltage for the shunt wound DC motor. The chopper is provided with m chopping units; the control signal includes m unit control signals that respectively correspond to the m chopping units and are formed accord-
(Continued)

ing to a preset phase stagger rule; each of the unit control signals includes w switching control signals that correspond to w switching control ends in the corresponding chopping units; m first power output ends of all the chopping units and m second power output ends of all the chopping units respectively correspondingly form m pairs of power output terminals; and m pairs of external wiring terminals of the shunt wound DC motor are connected with the m pairs of power output terminals in a one-to-one correspondence manner, wherein m is a positive integer of being not less than 2; and w is 1, 2 or 4.

20 Claims, 22 Drawing Sheets

(30) Foreign Application Priority Data

| Dec. 29, 2018 | (CN) | 201811654450.7 |
| Dec. 29, 2018 | (CN) | 201811654478.0 |
| Dec. 29, 2018 | (CN) | 201811654564.1 |
| Dec. 29, 2018 | (CN) | 201811654631.X |

(51) Int. Cl.
*H02K 11/33* (2016.01)
*H02K 23/06* (2006.01)
*H02K 5/22* (2006.01)

(58) Field of Classification Search
CPC ........ H02K 23/06; H02K 23/08; H02K 23/28; H02K 5/225; H02K 47/12; H02K 47/14; H02K 47/16; H02P 7/282; H02P 7/2825; H02P 7/298; H02P 7/2985
USPC .......................................... 310/180, 184, 185
See application file for complete search history.

(56) References Cited

U.S. PATENT DOCUMENTS

| 2021/0242762 A1* | 8/2021 | Jin ........................ H02K 3/325 |
| 2022/0021281 A1* | 1/2022 | Jin ........................ H02K 5/225 |

FOREIGN PATENT DOCUMENTS

| CN | 107086830 A | 8/2017 |
| CN | 107086831 A | 8/2017 |
| JP | H03273894 A | 12/1991 |
| JP | H10309090 A * | 1/1997 |

OTHER PUBLICATIONS

Written Opinion of the International Search Report in PCT/CN2019/074395, issued by ISA, dated Aug. 22, 2019.

* cited by examiner

SHUNT WOUND DC MOTOR DRIVING DEVICE AND ELECTRICAL EQUIPMENT

TECHNICAL FIELD

The present invention belongs to the field of DC motor driving devices, in particular to a shunt wound direct-current (DC) motor driving device and electrical equipment including the shunt wound DC motor driving device.

BACKGROUND

Exciting windings and armature windings of a shunt wound DC motor are connected in series and share the same power supply. The shunt wound DC motor has advantages of excellent speed control performance, large starting torque and high overload capacity, and is widely applied to rolling mills, electric locomotives, large machine tool spindle transmission systems and ships.

As shown in FIG. 6, throughout hundreds of years of history of motor development, a traditional shunt wound DC motor driving device 200 is composed of a shunt wound DC motor and a chopper. The shunt wound DC motor is only provided with one pair of external wiring terminals; and the pair of external wiring terminals are correspondingly electrically connected with one pair of power output terminals of the chopper. To ensure system reliability, maximum output current of the chopper is generally 2-3 times that of rated current of the motor. A high-power high-performance shunt wound DC motor, particularly a low-voltage large-current shunt wound DC motor, needs a chopper having extremely large continuous operating current. However, switching components in related choppers are expensive, and the maximum output current of the chopper used by the high-performance motor that can be purchased in the market is only less than one thousand amperes, thereby seriously restricting and affecting the development of the low-voltage large-current shunt wound DC motor.

The chopper controls switch-on and off of power switch tubes to change output voltage and output current by a pulse width modulation technology. The size of output current ripple is in direct proportion to sizes of output torque ripple and rotation speed ripple of the motor and is also inversely proportional to switching frequency of the power switch tubes, while switching loss (or temperature rise and a failure rate) of the power switch tubes is in direct proportion to the switching frequency of the power switch tubes. Therefore, to decrease the output current, torque and rotation speed ripple of the motor, the switching frequency must be increased. However, to decrease the switching loss of the power switch tubes, the switching frequency of the power switch tubes must be decreased. Such a contradictory relation affects the development of the shunt wound DC motor driving device, so that the shunt wound DC motor driving device is difficult to be applied to numerically-controlled machine tools and other devices having strict requirements on the rotation speed and the torque ripple. For example, due to invisible requirements, the shunt wound DC motor applied to national defense equipment shall greatly decrease the own vibration and noise, that is, requirements on the output torque ripple and the current ripple are particularly strict. At present, the traditional shunt wound DC motor applied to high-power national defense equipment difficultly deals with an increasingly advanced investigation technology.

Based on the above reasons, the development of the shunt wound DC motor driving device is restricted and affected, thereby further affecting development of electrical equipment including electric cars, electric ships and electric aircrafts, even electric war chariots, electric warships, electric aircrafts and electrically driven aircraft carriers in national defense, and affecting economic construction and national defense construction.

SUMMARY OF THE INVENTION

The present invention is provided for solving the above problems. A purpose of the present invention is to provide a shunt wound DC motor driving device and electrical equipment including the shunt wound DC motor driving device.

To achieve the above purpose, technical solutions of the present invention are adopted as follows:

<Structure 1>

The present invention provides a shunt wound DC motor driving device. The shunt wound DC motor driving device includes a shunt wound DC motor having a rated voltage; a DC power supply having a constant voltage that corresponds to the rated voltage; and a chopper that converts the constant voltage into a variable voltage based on a control signal and provides the variable voltage for the shunt wound DC motor. The chopper is provided with m chopping units; each of the chopping units is provided with a first power output end, a second power output end and w switching control ends; the control signal includes m unit control signals that respectively correspond to the m chopping units and are formed according to a preset phase stagger rule; each of the unit control signals includes w switching control signals that correspond to the w switching control ends in the corresponding chopping units; the w switching control ends are used for correspondingly receiving the w switching control signals; and m first power output ends of all the chopping units and m second power output ends of all the chopping units respectively correspondingly form m pairs of power output terminals. The shunt wound DC motor includes a casing; m pairs of electric brushes fixed in the casing; a stator, arranged in the casing and including m pairs of main poles corresponding to the m pairs of electric brushes and further including an exciting winding part; and a rotor that is arranged in the stator and includes a plurality of armature windings connected in a one-to-one correspondence manner in a preset connection manner. Each pair of the main poles includes an S-polarity main pole and an N-polarity main pole; two adjacent main poles have different polarities; two electric brushes in each pair of electric brushes have adjacent positions; and each pair of the electric brushes includes an S-pole corresponding electric brush that corresponds to the S-polarity main pole and an N-pole corresponding electric brush that corresponds to the N-polarity main pole. The exciting winding part includes m exciting winding units. Each of the exciting winding units is formed by respectively making exciting coils from insulated conductor strips composed of metal wires coated with insulating layers on at least one pair of main poles. The insulated conductor strip in each of the exciting winding units is provided with one end and the other end. The m ends of all the insulated conductor strips are electrically connected with m S-pole corresponding electric brushes in all the electric brushes to form m first wiring terminals; meanwhile, the m other ends of all the insulated conductor strips are electrically connected with m N-pole corresponding electric brushes in all the electric brushes to form m second wiring terminals; or the m ends of all the insulated conductor strips are electrically connected with m N-pole corresponding electric brushes in all the electric brushes to form m first wiring terminals. Meanwhile, the m other ends of all the insulated conductor strips are electrically connected with m S-pole corresponding electric brushes in all the electric brushes to form m second wiring terminals. The m first wiring terminals and the m second wiring terminals respectively correspondingly form m pairs of external wiring terminals; and the m pair of external wiring terminals are connected with the m pairs of power output terminals in a one-to-one correspondence manner, wherein m is a positive integer of being not less than 2; and w is 1, 2 or 4.

The shunt wound DC motor driving device provided by the present invention may have characteristics as follows: w is equal to 1; each of the chopping units is further provided with an upper bridge arm and a lower bridge arm connected in series with each other; the upper bridge arm is connected with a positive pole of the DC power supply; the lower bridge arm is connected with a negative pole of the DC power supply; the upper bridge arm includes at least one power switch tube and a switching control end; each power switch tube is provided with a control pole; the switching control end is formed based on the control pole; the lower bridge arm includes at least one diode; the first power output end is arranged between the upper bridge arm and the lower bridge arm; and the second power output end is arranged at the connection end of the lower bridge arm and the DC power supply.

The shunt wound DC motor driving device provided by the present invention may have characteristics as follows: the preset phase stagger rule is that phases of the m switching control signals are respectively staggered by 1/m switching cycle in sequence; or, m is an even number, and the preset phase stagger rule is that the phases of the m switching control signals are respectively staggered by 2/m switching cycle in sequence.

The shunt wound DC motor driving device provided by the present invention may have characteristics as follows: w is equal to 2; each of the chopping units is further provided with an upper bridge arm and a lower bridge arm connected in series with each other; the upper bridge arm is connected with a positive pole of the DC power supply; the lower bridge arm is connected with a negative pole of the DC power supply; the upper bridge arm and the lower bridge arm respectively include at least one power switch tube, at least one diode in reverse parallel connection with the power switch tube, and a switching control end; each power switch tube is provided with a control pole; the switching control end is formed based on the control pole; the switching control end in the upper bridge arm serves as an upper bridge arm switching control end, and the switching control end in the lower bridge arm serves as a lower bridge arm switching control end, used for correspondingly receiving two switching control signals; the first power output end is arranged between the upper bridge arm and the lower bridge arm; and the second power output end is arranged at the connection end of the lower bridge arm and the DC power supply.

The shunt wound DC motor driving device provided by the present invention may have characteristics as follows: the preset phase stagger rule is as follows: m phases that respectively correspond to the m unit control signals serving as m preset phases are staggered by 1/m switching cycle in sequence; in each of the chopping units, the switching control signal that corresponds to the upper bridge arm switching control end is set as a reference switching control signal; a phase of the reference switching control signal is set according to a preset phase corresponding to the control signal; a switching control signal that corresponds to the lower bridge arm switching control end is set reciprocal to the reference switching control signal; or, m is an even number, and the preset phase stagger rule is as follows: the m phases that respectively correspond to the m unit control signals serving as m preset phases are staggered by 2/m switching cycle in sequence; in each of the chopping units, the switching control signal that corresponds to the upper bridge arm switching control end is set as the reference switching control signal; the phase of the reference switching control signal is set according to the preset phase corresponding to the unit control signal; and a switching control signal that corresponds to the lower bridge arm switching control end is set reciprocal to the reference switching control signal.

The shunt wound DC motor driving device provided by the present invention may have characteristics as follows: w is equal to 4; each of the chopping units is further provided with a first bridge arm and a second bridge arm connected in parallel with each other; the first bridge arm includes a first upper bridge arm and a first lower bridge arm connected in series with each other; the second bridge arm includes a second upper bridge arm and a second lower bridge arm connected in series with each other; the first upper bridge arm and the second upper bridge arm are connected with the positive pole of the DC power supply; the first lower bridge arm and the second lower bridge arm are connected with the negative pole of the DC power supply; the first upper bridge arm, the first lower bridge arm, the second upper bridge arm and the second lower bridge arm respectively include at least one power switch tube, at least one diode in reverse parallel connection with the power switch tube, and a switching control end; each power switch tube is provided with a control pole; the switching control end is formed based on the control pole; the switching control end in the first upper bridge arm serves as a first upper bridge arm switching control end, a switching control end in the first lower bridge arm serves as a first lower bridge arm switching control end, a switching control end in the second upper bridge arm serves as a second upper bridge arm switching control end, and a switching control end in the second lower bridge arm serves as a second lower bridge arm switching control end, used for correspondingly receiving four switching control signals; the first power output end is arranged between the first upper bridge arm and the first lower bridge arm; and the second power output end is arranged between the second upper bridge arm and the second lower bridge arm.

The shunt wound DC motor driving device provided by the present invention may have characteristics as follows: the preset phase stagger rule is as follows: m phases that respectively correspond to the m unit control signals serving as m preset phases are staggered by 1/m switching cycle in sequence; in each of the chopping units, two switching control signals that correspond to the first upper bridge arm switching control end and the second lower bridge arm switching control end are set as reference switching control signals. Phases of the reference switching control signals are set according to preset phases that correspond to the unit control signals. Two switching control signals that correspond to the first lower bridge arm switching control end and the second upper bridge arm switching control end are set reciprocal to the reference switching control signals; or, m is an even number, the preset phase stagger rule is as follows: m phases that respectively correspond to the m unit control signals serving as m preset phases are staggered by 2/m switching cycle in sequence; in each of the chopping units, the two switching control signals that correspond to the first upper bridge arm switching control end and the second lower bridge arm switching control end are set as the reference switching control signals; the phases of the reference switching control signals are set according to preset phases that correspond to the unit control signals; and two switching control signals that correspond to the first lower bridge arm switching control end and the second upper bridge arm switching control end are set reciprocal to the reference switching control signals.

The shunt wound DC motor driving device provided by the present invention may have characteristics as follows: the DC power supply is provided with m pairs of power supply output terminals that are respectively connected with the m chopping units.

The shunt wound DC motor driving device provided by the present invention may have characteristics as follows: the DC power supply is composed of m mutually independent DC power units; and each of the DC power units is provided with one pair of power supply output terminals.

The shunt wound DC motor driving device provided by the present invention may have characteristics as follows: the shunt wound DC motor driving device further includes a control part including a controller and an amplifier. The controller generates m unit control signals according to the preset phase stagger rule; and the amplifier amplifies w switching control signals in each of the unit control signals and provides the w amplified switching control signals for the w switching control ends in the corresponding chopping units.

The shunt wound DC motor driving device provided by the present invention may have characteristics as follows: w is equal to 1; the amplifier is composed of m mutually independent amplifier units; the m amplifier units respectively correspond to the m chopping units; and each of the amplifier units is provided with an amplified signal output end in corresponding connection with the switching control end.

The shunt wound DC motor driving device provided by the present invention may have characteristics as follows: w is equal to 2 or 4; the amplifier is composed of m mutually independent amplifier units; the m amplifier units respectively correspond to the m chopping units; each of the amplifier units is provided with an amplified signal output part; and the amplified signal output parts are composed of w amplified signal output ends.

The shunt wound DC motor driving device provided by the present invention may have characteristics as follows: the controller further generates m enable signals that respectively correspond to the m amplifier units; and each of the enable signals is used for controlling an operating state of a corresponding amplifier unit.

The shunt wound DC motor driving device provided by the present invention may have characteristics as follows: the m exciting winding units respectively correspond to the m pairs of main poles; and the insulated conductor strip in each of the exciting winding units is formed on one corresponding pair of main poles.

The shunt wound DC motor driving device provided by the present invention may have characteristics as follows: the exciting coils on the various main poles have the same number of turns; each pair of the main poles corresponds to spatial locations of one corresponding pair of electric brushes; and in each of the exciting winding units, a connection relationship of two exciting coils is any one of series connection and parallel connection, and the connection relationship of two exciting coils in each exciting winding unit is the same.

The shunt wound DC motor driving device provided by the present invention may have characteristics as follows: the insulated conductor strips in each of the exciting winding units are formed on the m pairs of main poles.

The shunt wound DC motor driving device provided by the present invention may have characteristics as follows: the m exciting coils on the various main poles have the same winding direction and the same number of turns; and in each of the exciting winding units, a connection relationship of 2m exciting coils is any one of series connection, parallel connection and series-parallel connection, and the connection relationship of the 2m exciting coils is the same in each of the exciting winding units.

The shunt wound DC motor driving device provided by the present invention may have characteristics as follows: the preset connection manner may be any one of single lap, multiplex lap and compound ripple.

<Structure 2>

The present invention further provides electrical equipment. The electrical equipment includes a shunt wound DC motor driving device, wherein the shunt wound DC motor driving device is the shunt wound DC motor driving device in the <Structure 1>.

The electrical equipment provided by the present invention may have characteristics as follows: the electrical equipment is any one of a rolling mill, an electric locomotive, a large machine tool spindle transmission system and a ship.

Actions and Effects of the Present Invention

According to the shunt wound DC motor driving device and the electrical equipment including the shunt wound DC motor driving device involved in the present invention, the chopper is provided with the m chopping units; each of the chopping units is provided with the first power output end, the second power output end and w switching control ends; the control signal includes m unit control signals that respectively correspond to the m chopping units and are formed according to a preset phase stagger rule; each of the unit control signals includes w switching control signals that correspond to the w switching control ends in the corresponding chopping units; the w switching control ends are used for correspondingly receiving the w switching control signals; and m first power output ends of all the chopping units and m second power output ends of all the chopping units respectively correspondingly form m pairs of power output terminals. The exciting winding part includes m exciting winding units. Each of the exciting winding units is formed by respectively making exciting coils from insulated conductor strips composed of metal wires coated with insulating layers on at least one pair of corresponding main poles. The insulated conductor strip in each of the exciting winding units is provided with one end and the other end. The m ends of all the insulated conductor strips are electrically connected with m S-pole corresponding electric brushes in all the electric brushes to form m first wiring terminals; meanwhile, the m other ends of all the insulated conductor strips are electrically connected with m N-pole corresponding electric brushes in all the electric brushes to form m second wiring terminals; or, the m ends of all the insulated conductor strips are electrically connected with m N-pole corresponding electric brushes in all the electric brushes to form m first wiring terminals; and meanwhile, the m other ends of all the insulated conductor strips are electrically connected with m S-pole corresponding electric brushes in all the electric brushes to form m second wiring terminals. The m first wiring terminals and the m second wiring terminals respectively correspondingly form m pairs of external wiring terminals; and the m pairs of external wiring terminals are connected with m pairs of power output terminals in a one-to-one correspondence manner. In other words, each pair of the external wiring terminals is connected with one exciting winding unit and a pair of electric brushes in mutual series-shunt connection. Therefore, a branch circuit composed of each exciting winding unit and the pair of electric brushes in corresponding connection is mutually independent; current of each branch circuit is also independent; each branch circuit can independently work, and power of each branch circuit is independently provided by one pair of corresponding power output terminals, i.e., each pair of the power output terminals only undertakes operating current of one branch circuit, wherein the operating current is only 1/m of rated input current of the motor. Therefore, even for the motor having extremely large rated input current, as long as the m is greater enough, the operating current of each branch circuit or output current of each pair of the power output terminals will be correspondingly decreased, so that according to the low enough output current of the power output terminals, requirements on the high-power high-performance motor can be met without adopting a parallel current evenness technology but by using an ordinary power switch tube or a power module. Moreover, cost of the chopper is decreased; requirements of connecting wires and connectors between the external wiring terminals and the power output terminals on contact resistance and insulation are lowered; production and manufacture difficulty is lowered; and reliability and safety of the system are increased.

Moreover, since the control signal includes the m switching control signals that respectively correspond to the m chopping units and are formed according to the preset phase stagger rule, current ripple phases of each pair of the power output terminals are mutually different. Therefore, peak values of ripple peaks of the m superposed current ripples are decreased; peak values of ripple peaks of the output torque and the rotation speed are further decreased; the performance of the shunt wound DC motor is increased; and service life of the motor is prolonged.

To sum up, the shunt wound DC motor driving device in the present invention is simple in structure, short in connecting wire, simple in production process, easy to manufacture, convenient to maintain and low in production cost and maintenance cost, and has the advantages of reasonable structural design, simplicity and high reliability and safety. Therefore, the shunt wound DC motor driving device in the present invention can be applied to heavy-load electrical equipment such as electric cars, electric trucks, track cars, sightseeing tourist cars, trucks and ships, and can be further applied to high-performance electrical equipment such as numerically-controlled machine tools and submarines.

DETAILED DESCRIPTION OF THE PREFERRED EMBODIMENTS

Specific embodiments of the present invention will be described below in combination with drawings.

Embodiment 1

Figure 1:
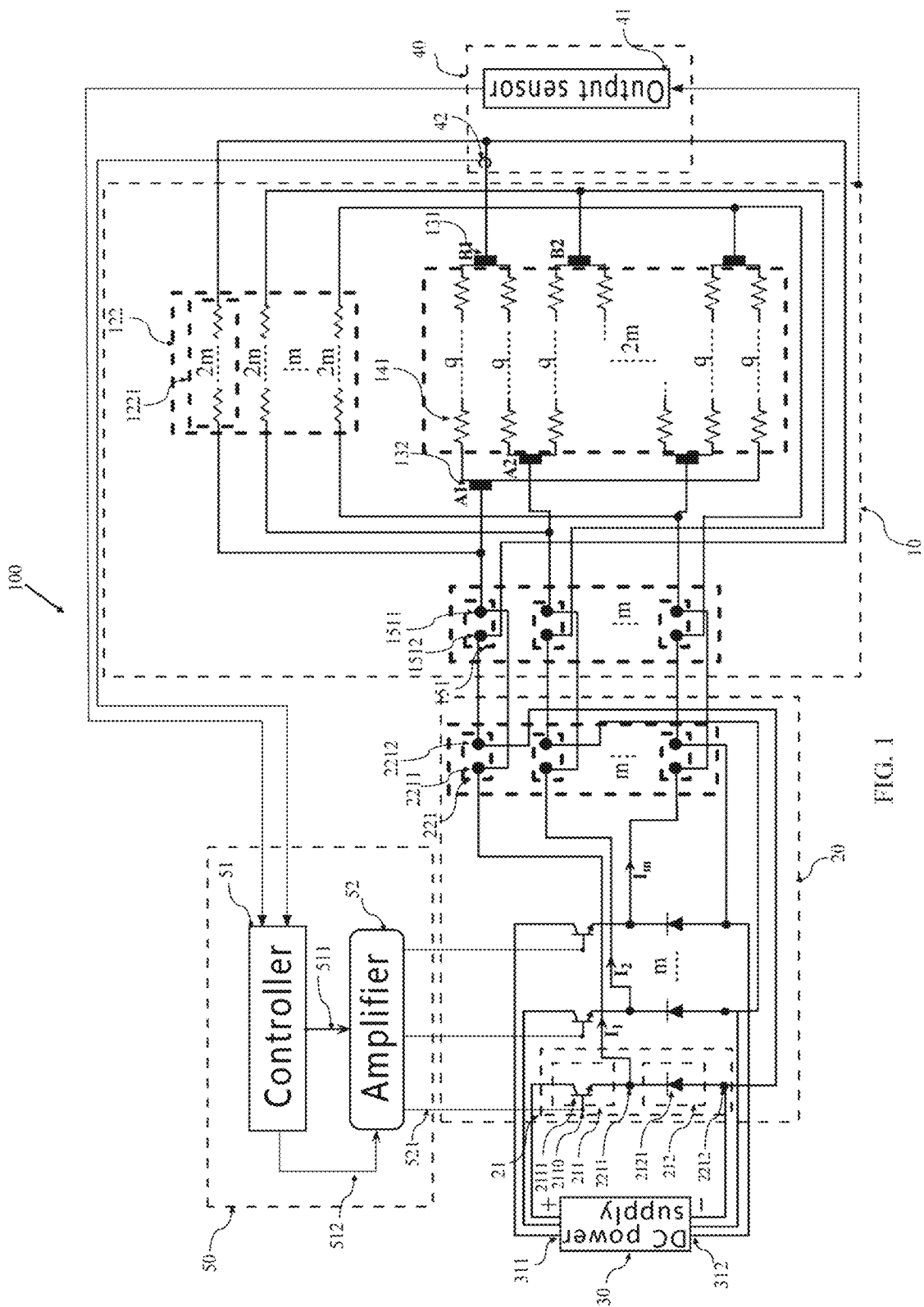
FIG. 1 is a schematic diagram of circuit connection of a shunt wound DC motor driving device in embodiment 1 of the present invention.
Figure 2:
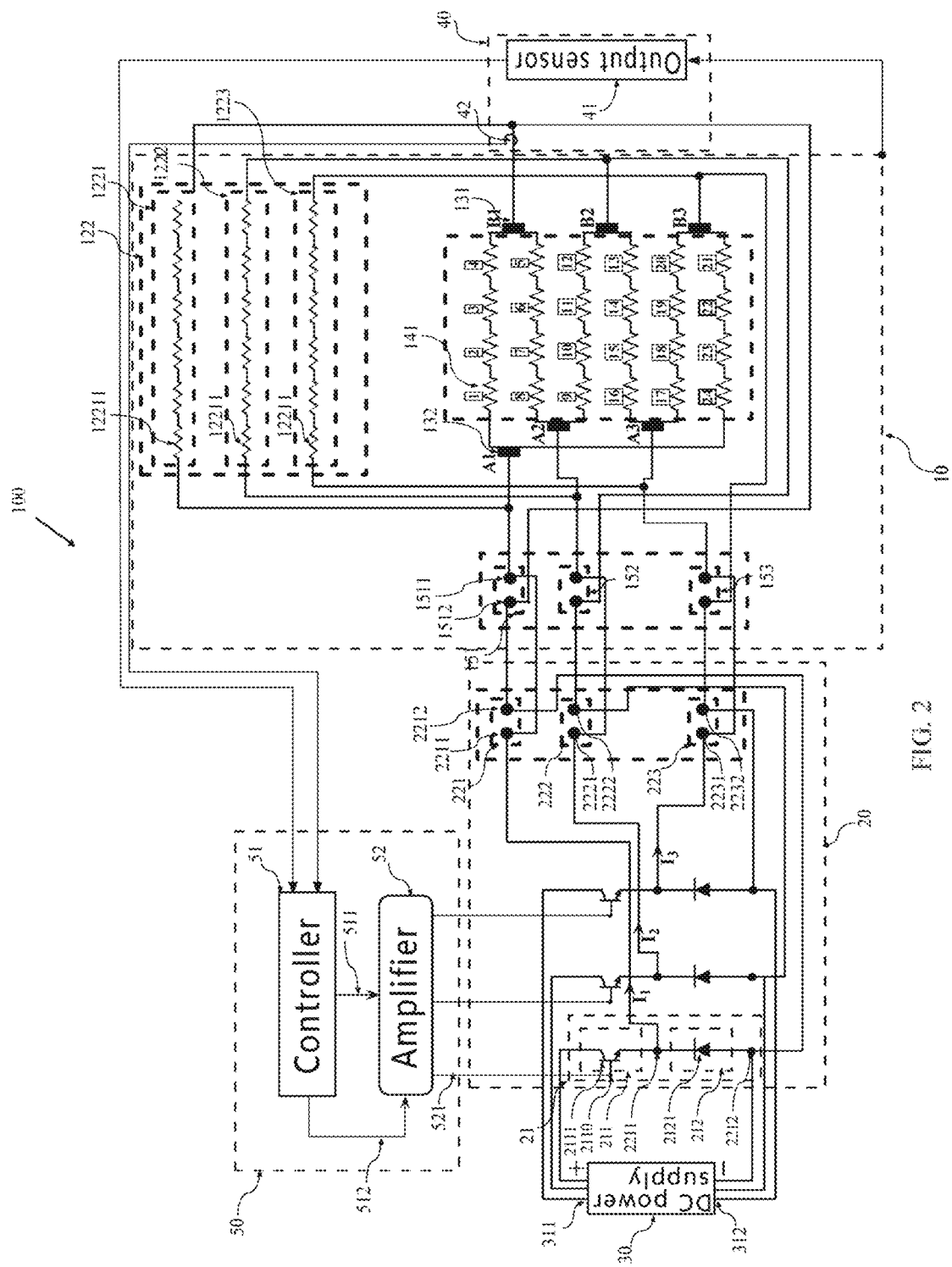
FIG. 2 is a schematic diagram of circuit connection of a shunt wound DC motor driving device in embodiment 1 of the present invention when m is equal to 3.

FIG. 1 is a schematic diagram of circuit connection of a shunt wound DC motor driving device in embodiment 1 of the present invention; and FIG. 2 is a schematic diagram of circuit connection of a shunt wound DC motor driving device in embodiment 1 of the present invention when m is equal to 3.

As shown in FIGS. 1 and 2, a shunt wound DC motor driving device 100 in the present embodiment 1 is arranged in electrical equipment such as a rolling mill, an electric locomotive, a large machine tool spindle transmission system and a ship, and is used for driving the electrical equipment. The shunt wound DC motor driving device 100 includes a shunt wound DC motor 10, a chopper 20, a DC power supply 30, a sensing part 40 and a control part 50.

Figure 3:
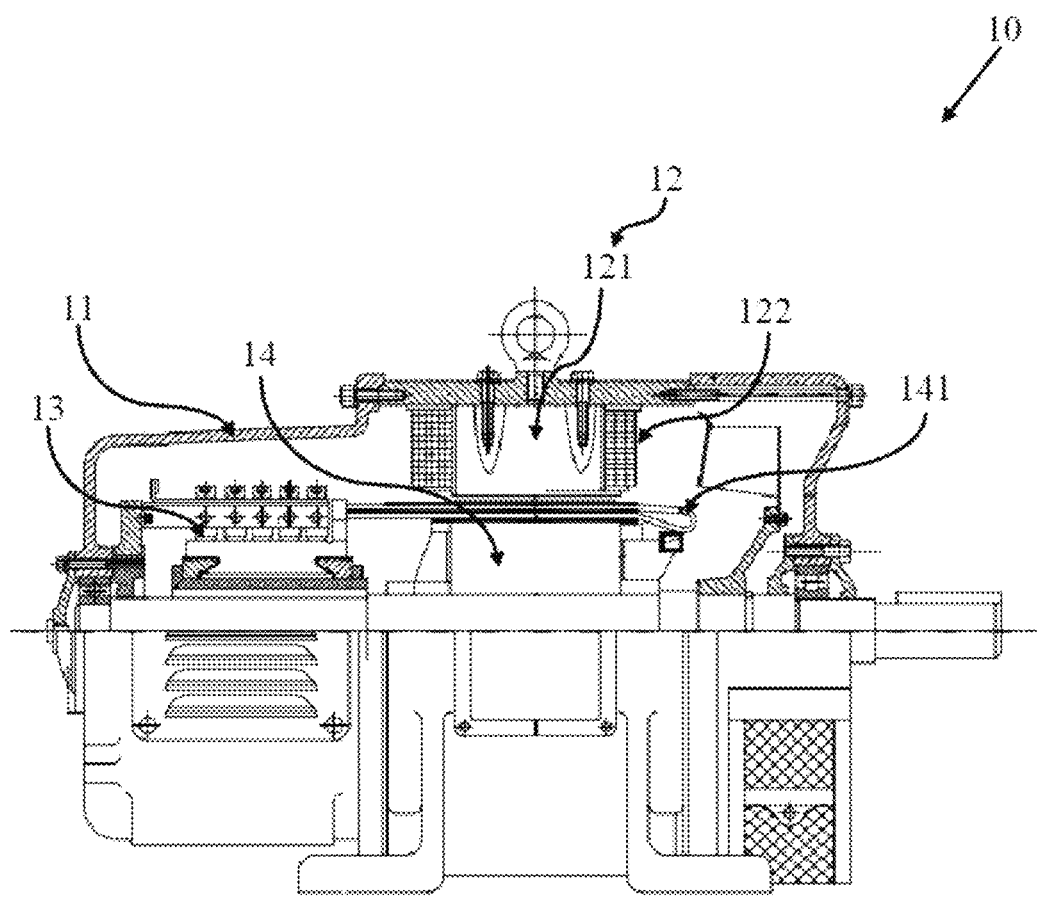
FIG. 3 is a schematic diagram of a longitudinal section of a shunt wound DC motor in embodiments of the present invention.
Figure 4:
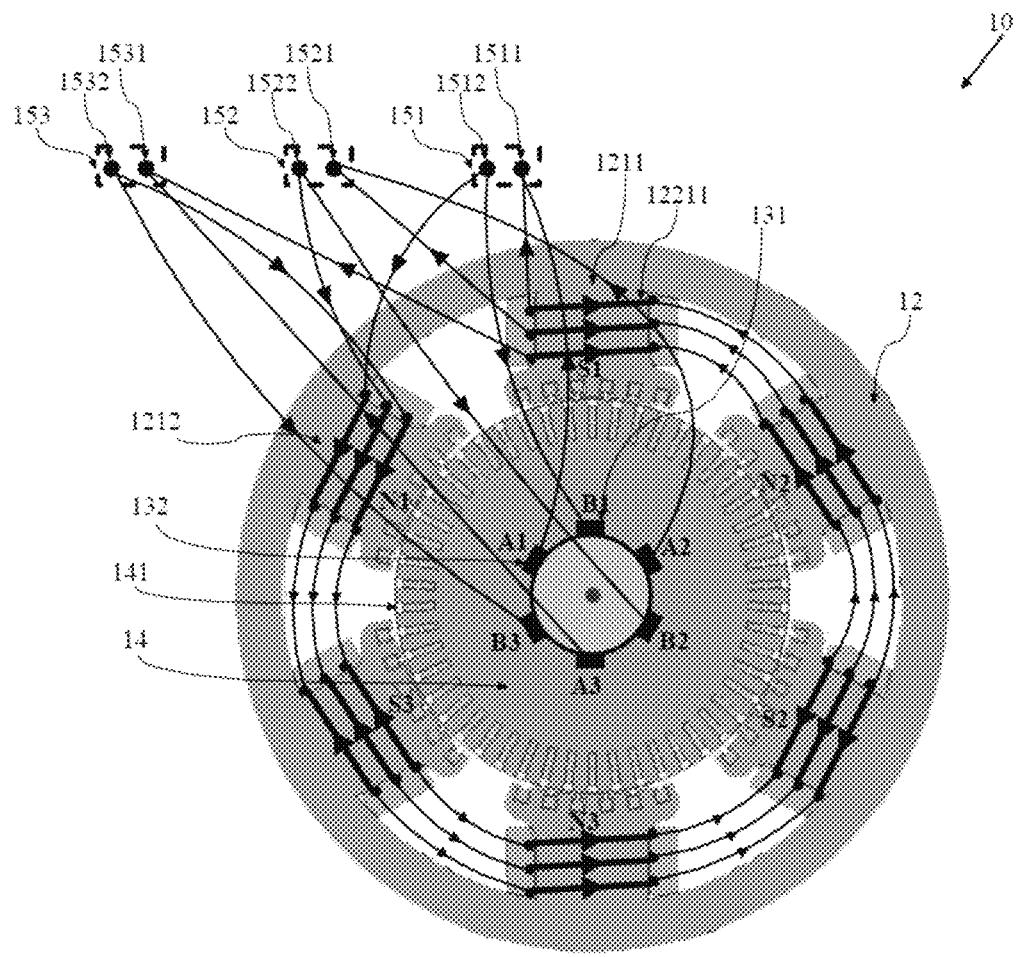
FIG. 4 is a schematic diagram of circuit connection of a transverse section of a shunt wound DC motor in embodiments of the present invention.

FIG. 3 is a schematic diagram of a longitudinal section of a shunt wound DC motor in embodiments of the present invention; and FIG. 4 is a schematic diagram of circuit connection of a transverse section of a shunt wound DC motor in embodiments of the present invention.

As shown in FIGS. 1-4, the shunt wound DC motor 10 has a rated voltage and rated current, and includes a casing 11, a stator 12, electric brushes 13, a rotor 14 and a junction box (unshown in the drawing). As shown in FIG. 1, the number of pairs of the electric brushes 13 is set as m according to a value of the rated current, wherein m is an integer of being not less than 2. As shown in FIGS. 2 and 4, m is set as 3 in the present embodiment 1.

As shown in FIGS. 1-4, the stator 12 is arranged in the casing 11, and includes 3 pairs of main poles 121, totaling 6 main poles, and an exciting winding part 122. Each of the main poles 121 includes 3 exciting coils 12211. Each of the exciting coils 12211 is formed by respectively winding insulated conductor strips composed of conductors coated with insulating layers on the main poles 121, wherein the insulated conductor strip is any one of enameled wire and insulated copper conducting bar. In the present embodiment, the insulated conductor strips are the enameled wires. In the present embodiment 1, the 3 exciting coils 12211 on each of the main poles 121 have the same winding direction and the same number of turns.

As shown in FIGS. 2-4, one exciting coil 12211 is respectively extracted from each of the main poles 121; and totally 6 exciting coils 12211 are connected into an exciting winding unit 1221. An exciting winding part 122 includes 3 exciting winding units 1221. The insulated conductor strip in each of the exciting winding units 1221 is provided with one end and the other end that are distinguished according to a preset current direction of the exciting coils 12211. Each pair of the main poles includes an S-polarity main pole 1211 and an N-polarity main pole 1212 that correspond to the winding directions of the exciting coils 12211 and the preset current direction of the exciting coils 12211.

In each of the exciting winding units 1221, a connection relationship of the 6 exciting coils 12211 is any one of series connection, parallel connection and series-parallel connection; and the 6 exciting coils 12211 in each of the exciting winding units 1221 have the same connection relationship. In the present embodiment 1, the connection relationship of the 6 exciting coils 12211 is the series connection.

As shown in FIGS. 3 and 4, the 3 pairs of totally 6 electric brushes 13 are arranged in the casing 11. Each pair of the electric brushes 13 includes an S-pole corresponding electric brush 131 that corresponds to the S-polarity main pole 1211 and an N-pole corresponding electric brush 132 that corresponds to the N-polarity main pole 1212.

The electric brush 13 is any one of a narrow electric brush and a wide electric brush. The electric brush 13 in the present embodiment 1 is the narrow electric brush. Each of the electric brushes 13 includes an electric brush body or at least two electric brush bodies that are arranged along an axial direction of the motor and separately formed in electrical parallel connection. When each of the electric brushes 13 includes the at least two electric brush bodies, an actual contact area between each of the electric brushes and a commutator is increased, thereby improving commutation performance of the electric brushes. As shown in FIGS. 2-4, each of the electric brushes 13 in the present embodiment 1 includes one electric brush body.

As shown in FIG. 1, the m ends of the insulated conductor strips in all the exciting winding units 1221 are electrically connected with m N-pole corresponding electric brushes 132 in all the electric brushes 13 to form m first wiring terminals 1511; the m other ends of the insulated conductor strips in all the exciting winding units 1221 are electrically connected with m S-pole corresponding electric brushes 131 in all the electric brushes 13 to form m second wiring terminals 1512; and the m first wiring terminals 1511 and the m second wiring terminals 1512 respectively correspondingly form m pairs of external wiring terminals. Certainly, according to needs, the m ends of the insulated conductor strips in all the exciting winding units 1221 are electrically connected with m S-pole corresponding electric brushes 131 in all the electric brushes 13 to form the m first wiring terminals 1511; and meanwhile, the m other ends of the insulated conductor strips in all the exciting winding units 1221 are electrically connected with m N-pole corresponding electric brushes 132 in all the electric brushes 13 to form the m second wiring terminals 1512.

In the present embodiment 1, as shown in FIGS. 2 and 4, the first wiring terminals 1511 and the second wiring terminals 1512 correspondingly form 1 pair of external wiring terminals 151; first wiring terminals 1521 and second wiring terminals 1522 correspondingly form 1 pair of external wiring terminals 152; and first wiring terminals 1531 and second wiring terminals 1532 correspondingly form 1 pair of external wiring terminals 153.

Figure 5:
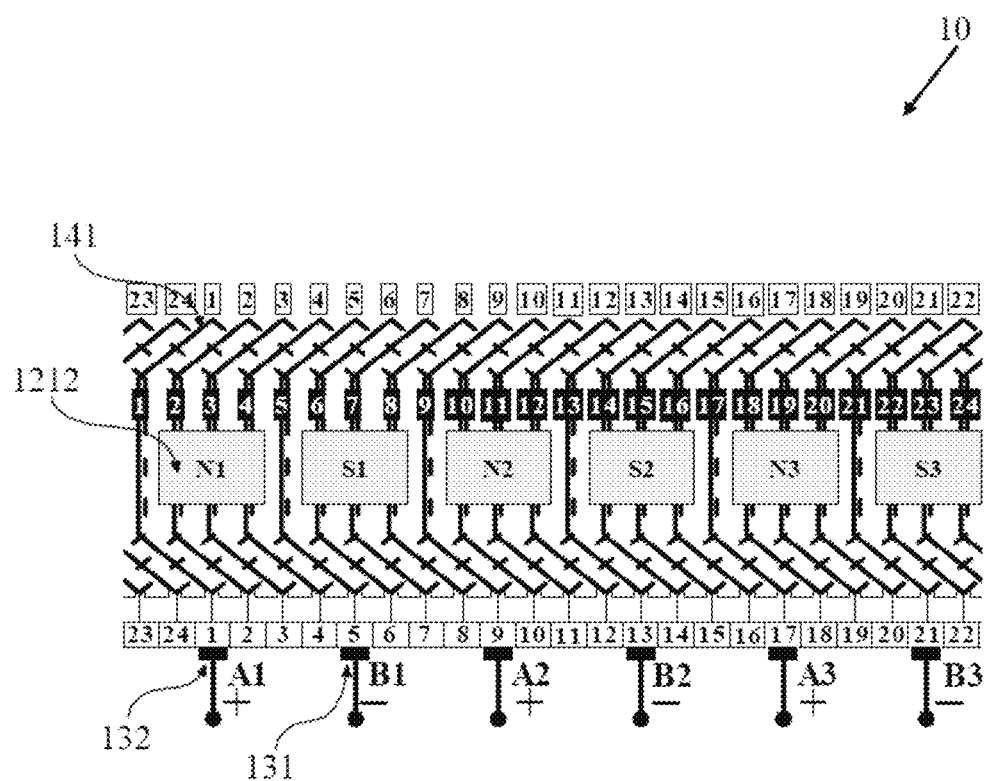
FIG. 5 is an unfolded schematic diagram of single lap connection of an armature winding of a shunt wound DC motor in embodiments of the present invention.
Figure 6:
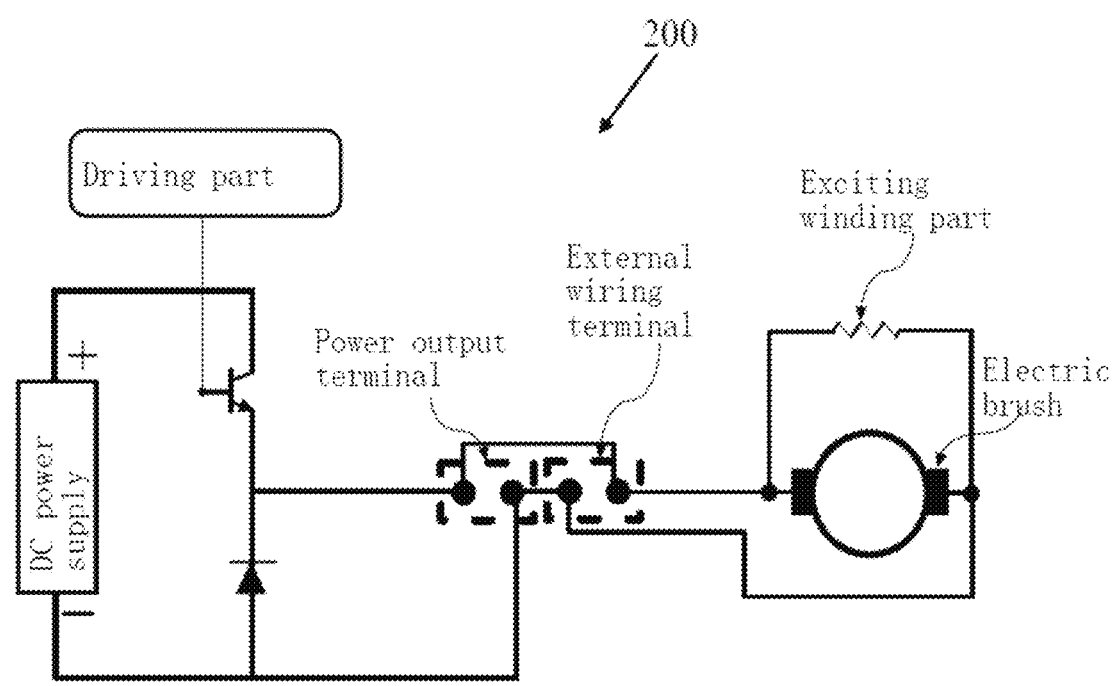
FIG. 6 is a schematic diagram of circuit connection of a traditional shunt wound DC motor driving device.

FIG. 5 is an unfolded schematic diagram of single lap connection of an armature winding of a shunt wound DC motor in the embodiments of the present invention.

As shown in FIGS. 1-4, the rotor 14 is arranged in the stator 12 and includes a plurality of armature windings 141 connected in a one-to-one correspondence manner in a preset connection manner, wherein the number of the armature windings 141 is set as 2m×q; and the preset connection manner is any one of single lap, multiplex lap and compound ripple. In the present embodiment 1, as shown in FIG. 5, the connection manner of the plurality of armature windings 141 is the single lap; two adjacent electric brushes 13 are connected to form an armature winding branch; and each armature winding branch includes q armature windings 141.

The junction box (unshown in the drawing) is fixed on the casing 11. As shown in FIGS. 2 and 4, the 3 pairs of external wiring terminals 151, 152 and 153 are arranged in the junction box.

As shown in FIG. 1, the chopper 20 converts a constant voltage of the DC power supply 30 into an average voltage controllable variable voltage based on a control signal transmitted by the control part 50, and provides the variable voltage for the shunt wound DC motor 10. The chopper 20 includes m chopping units 21 that respectively correspond to the m pairs of electric brushes 13. In the present embodiment 1, as shown in FIG. 2, the chopper 20 includes 3 chopping units 21.

Each of the chopping units 21 includes an upper bridge arm 211 and a lower bridge arm 212 connected with each other in series, and a first power output end 2211 and a second power output end 2212.

Each of the upper bridge arms 211 includes 1 power switch tube 2111 and a switching control end 2110; and each of the lower bridge arms 212 includes 1 fly-wheel diode 2121. The power switch tube 2111 is provided with a control pole; and the control pole forms the switching control end 2110.

When all the power switch tubes 2111 have the same maximum output current $I_1$, and the maximum current of the shunt wound DC motor 10 is $I_{max}$, the m meets the following condition: $m > I_{max} \div I_1$. The maximum output current is an important parameter of the power switch tube. The power switch tube may stably operate only at such a current value; and if the operating current exceeds the current value, the power switch tube may be broken down and then damaged due to overcurrent.

In the present embodiment 1, all the power switch tubes are half-controlled or full-controlled devices. The half-controlled devices are ordinary thyristors; and the full-controlled devices are any one of power field effect transistors, gate-turn-off thyristors, integrated gate-commutated thyristors, insulated gate bipolar transistors and power bipolar transistors.

As shown in FIG. 1, the first power output end 2211 is arranged between the upper bridge arm 211 and the lower bridge arm 212; and the second power output end 2212 is arranged at the connection end of the lower bridge arm 212 and the DC power supply 30. The m first power output ends 2211 of all the chopping units 21 and the m second power output ends 2212 of all the chopping units 21 respectively correspondingly form m pairs of power output terminals 221; and the m pairs of power output terminals 221 are connected with the m pairs of external wiring terminals 151 in a one-to-one correspondence manner.

In the present embodiment 1, as shown in FIG. 2, the first power output end 2211 and the second power output end 2212 correspondingly form 1 pair of power output terminals 221; the first power output end 2221 and the second power output end 2222 correspondingly form 1 pair of power output terminals 222; the first power output end 2231 and the second power output end 2232 correspondingly form 1 pair of power output terminals 223; and the 3 pairs of power output terminals 221, 222 and 223 are connected with the 3 pairs of external wiring terminals 151, 152 and 153 in a one-to-one correspondence manner.

As shown in FIGS. 1 and 2, the DC power supply 30 has a constant voltage corresponding to the rated voltage of the shunt wound DC motor 10, and is provided with m pairs of power supply output terminals that are connected with the m chopping units 21 in a one-to-one correspondence manner. Each pair of the power supply output terminals includes a positive pole 311 and a negative pole 312; the positive pole 311 is connected with the upper bridge arm 211 in the corresponding chopping unit 21; and the negative pole 312 is connected with the lower bridge arm 212 in the corresponding chopping unit 21.

As shown in FIGS. 1 and 2, the control part 50 receives an external instruction signal that corresponds to a displacement, a rotation speed or a torque output by the shunt wound DC motor 10.

The sensing part 40 is used for detecting a physical quantity of the shunt wound DC motor 10 and outputting a feedback signal to the control part 50. The sensing part 40 includes an output sensor 41 and a current sensor 42.

The output sensor 41 detects the displacement, the rotation speed or the torque output by the shunt wound DC motor 10 and output a corresponding output feedback signal to the control part 50.

The current sensor 42 detects line current values of electric brush outgoing lines in the shunt wound DC motor 10 and outputs a corresponding current feedback signal to the control part 50.

The control part 50 includes a controller 51 and an amplifier 52.

The controller 51 calculates generation according to the external instruction signal and the output feedback signal and the current feedback signal of the sensing part 40 and outputs a control signal 511 and an enable signal 512 to the amplifier 52. The control signal 511 includes m switching control signals that respectively correspond to the m chopping units 21 and are formed according to a preset phase stagger rule; and the enable signal 512 is used for controlling an operating state of the amplifier 52.

The amplifier 52 enters the operating state under control of the enable signal 512, amplifies the m switching control signals and correspondingly provides the m switching control signals for the m switching control ends 2110. The amplifier 52 is provided with m amplified signal output ends 521 that respectively correspond to the m chopping units 21; and the m amplified signal output ends 521 are connected with the m switching control ends 2110 in a one-to-one correspondence manner.

In the present embodiment 1, the preset stagger rule is as follows: phases of the m switching control signals are respectively staggered by 1/m switching cycle in sequence, so that peak values of ripple peaks of the superposed current ripples of the output current of the power output terminals of the m chopping units are decreased, thereby decreasing peak values of ripple peaks of the output torque and the rotation speed, further increasing the performance of the shunt wound DC motor and prolonging service life of the motor. Certainly, according to the needs, when the m is an even number, the preset stagger rule is as follows: the phases of the m switching control signals are respectively staggered by 2/m switching cycle in sequence. Thus, the output current of the power output terminals of every two chopping units corresponding to every two pairs of the electric brushes with opposite spatial positions has the same current ripples, thereby producing a couple moment in the motor, avoiding a friction moment between a shaft and a bearing caused by the reason that the torque ripple output by the motor cannot form the couple moment, decreasing wear between the shaft and the bearing, increasing the performance of the motor and prolonging the service life of the motor.

Figure 7:
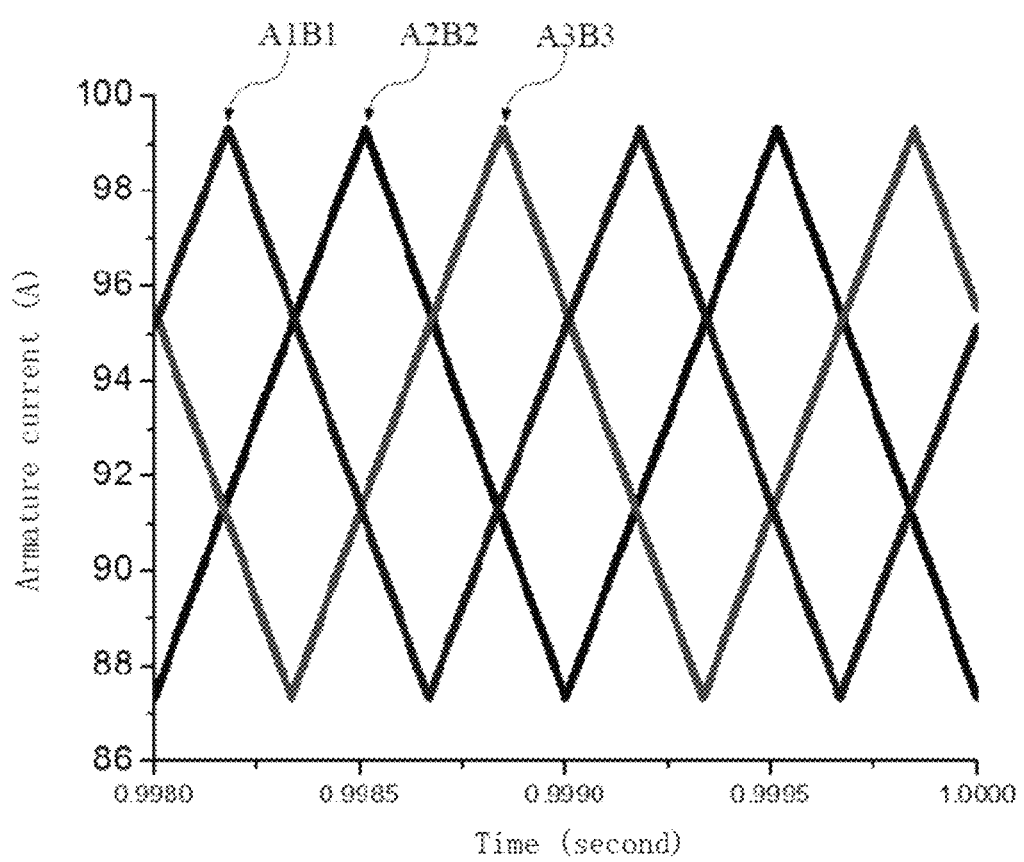
FIG. 7 is an input current waveform graph of three pairs of electric brushes of a shunt wound DC motor in embodiments of the present invention.
Figure 8:
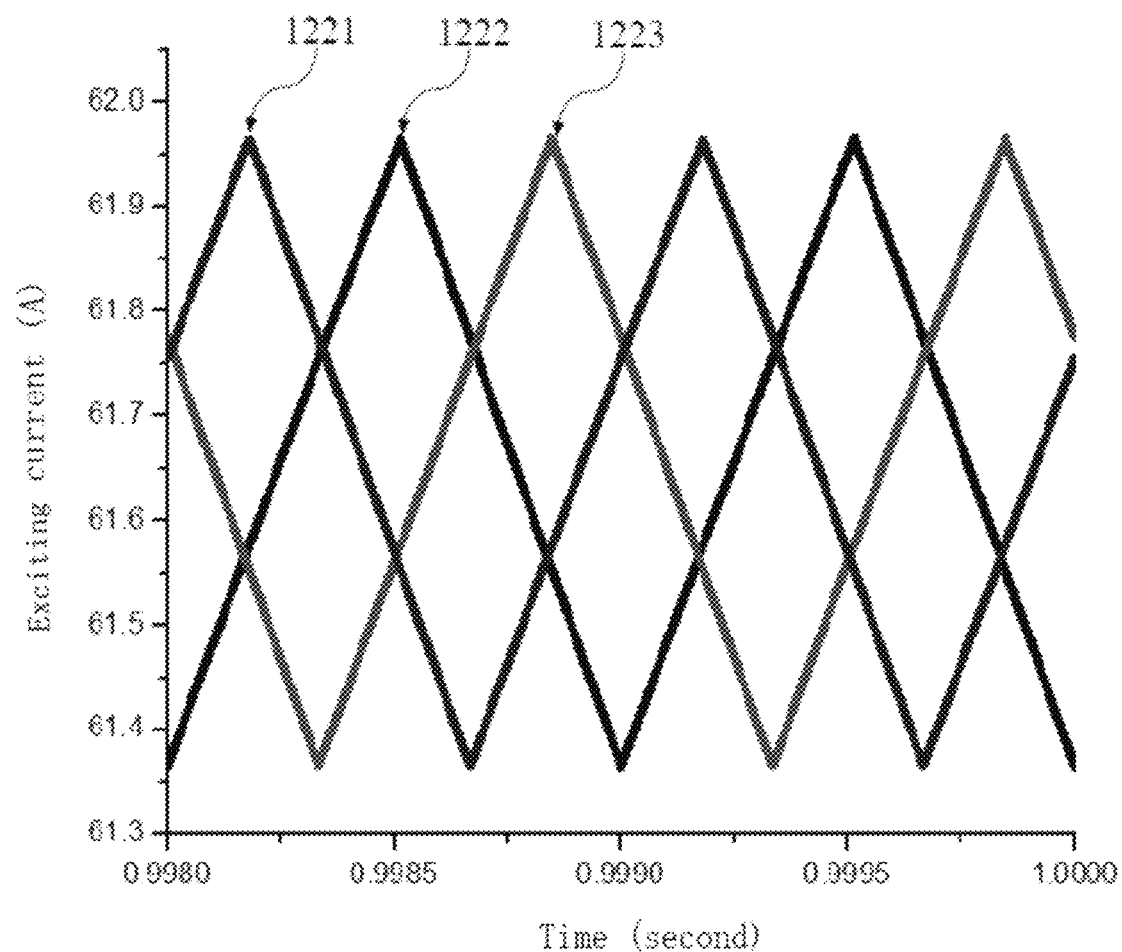
FIG. 8 is an input current waveform graph of three exciting winding units of a shunt wound DC motor in embodiments of the present invention.
Figure 9:
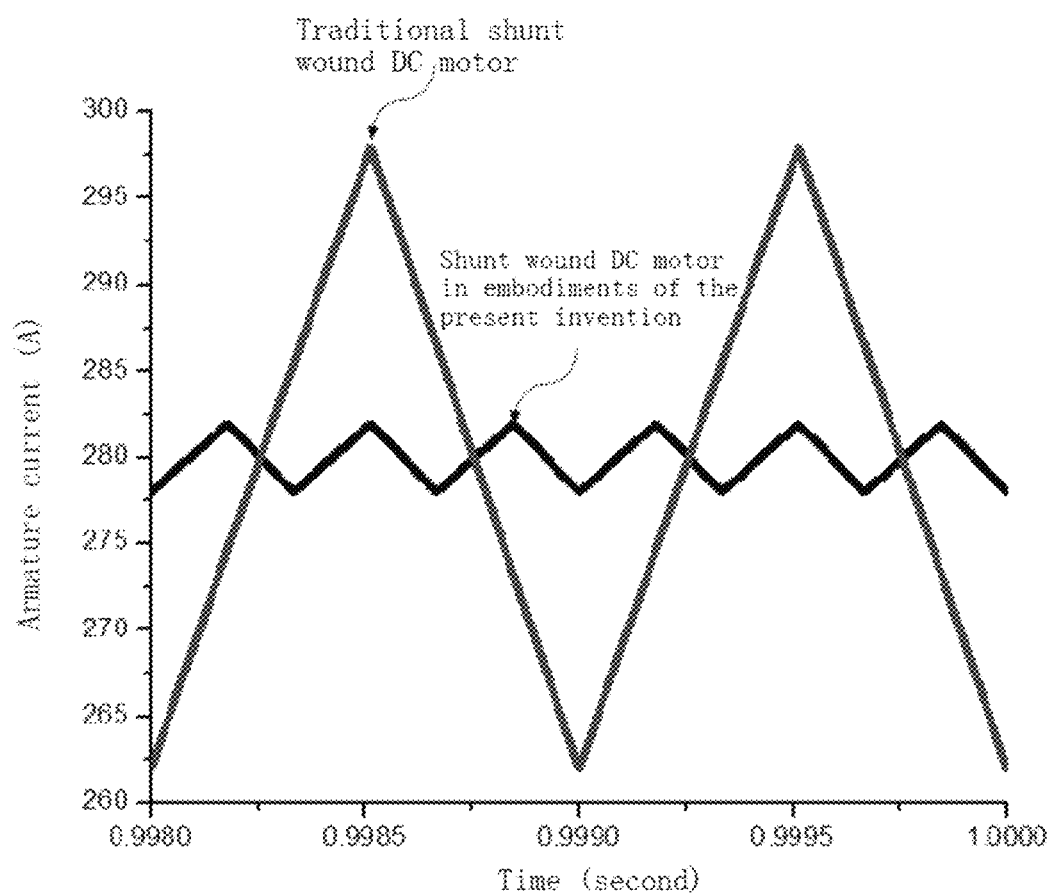
FIG. 9 is a comparison diagram of armature current of a shunt wound DC motor in embodiments of the present invention and armature current of a traditional shunt wound DC motor.
Figure 10:
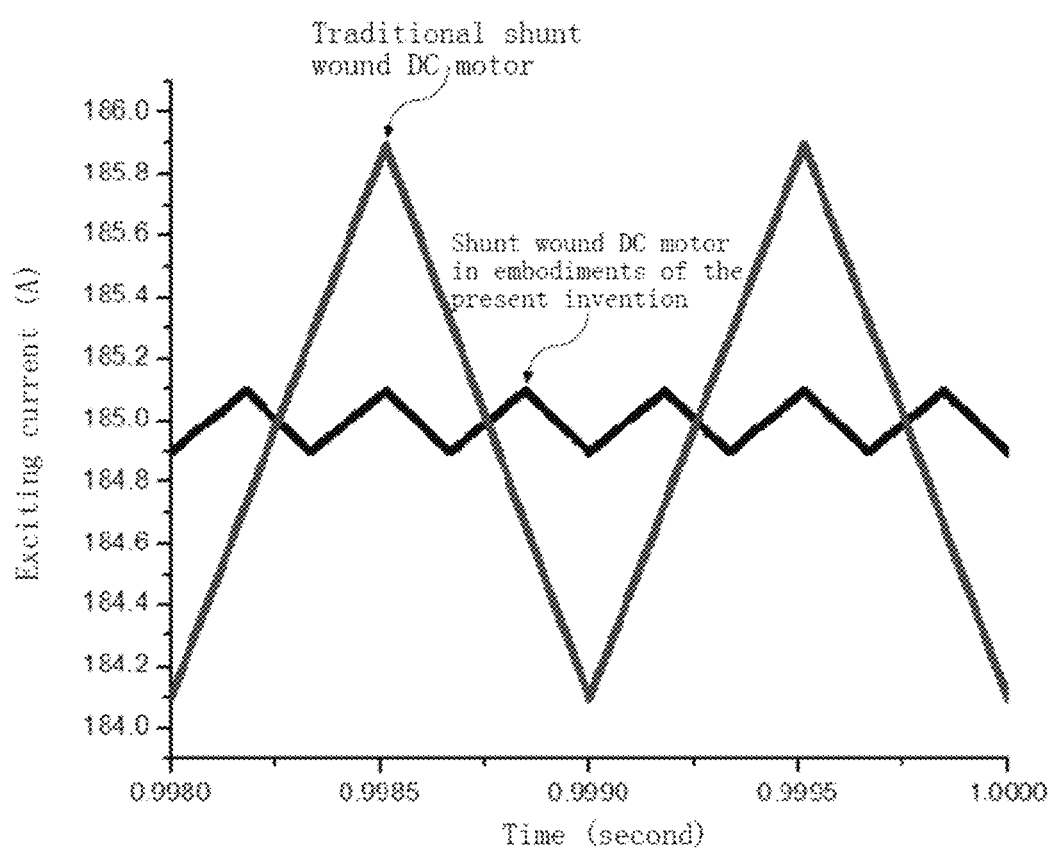
FIG. 10 is a comparison diagram of exciting current of a shunt wound DC motor in embodiments of the present invention and exciting current of a traditional shunt wound DC motor.
Figure 11:
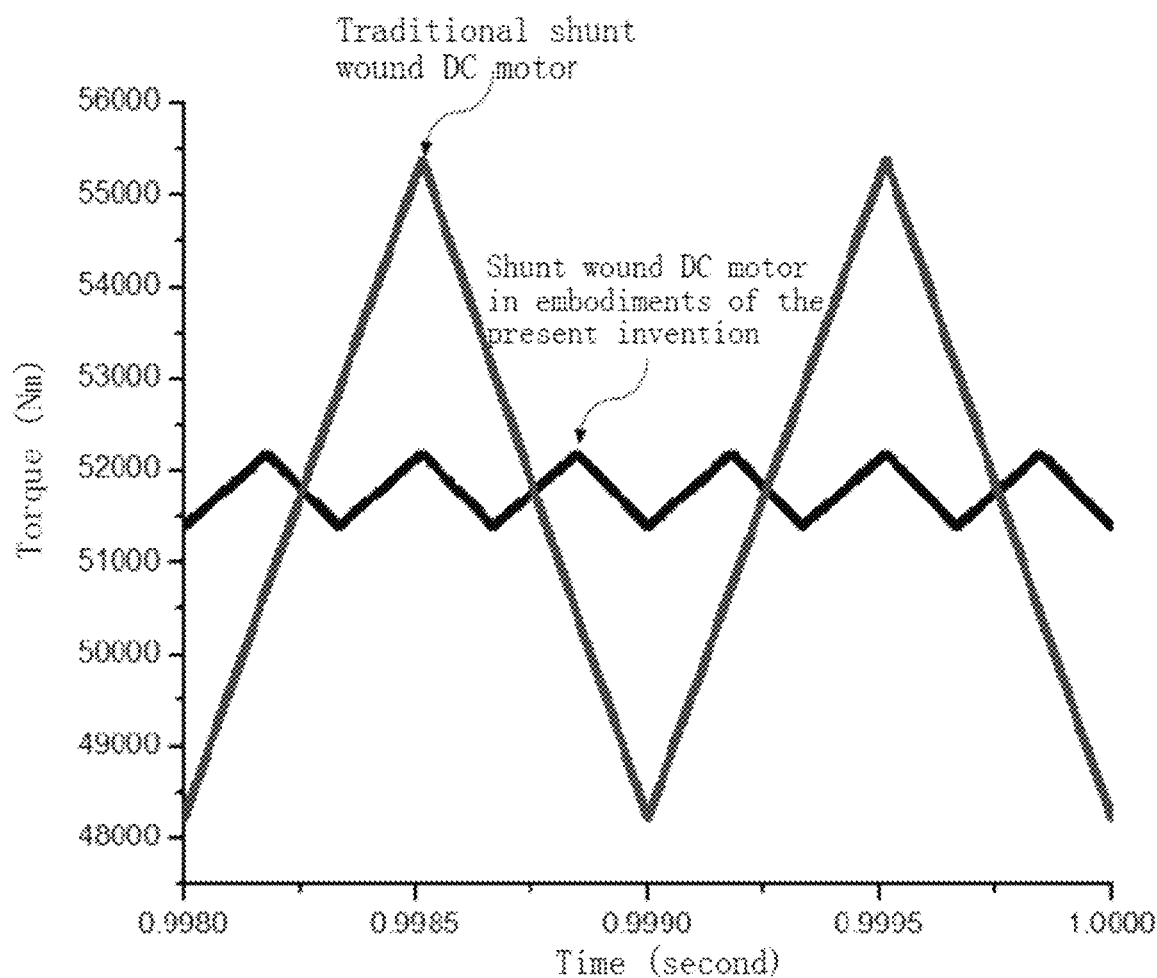
FIG. 11 is a comparison diagram of a torque of a shunt wound DC motor in embodiments of the present invention and a torque of a traditional shunt wound DC motor.
Figure 12:
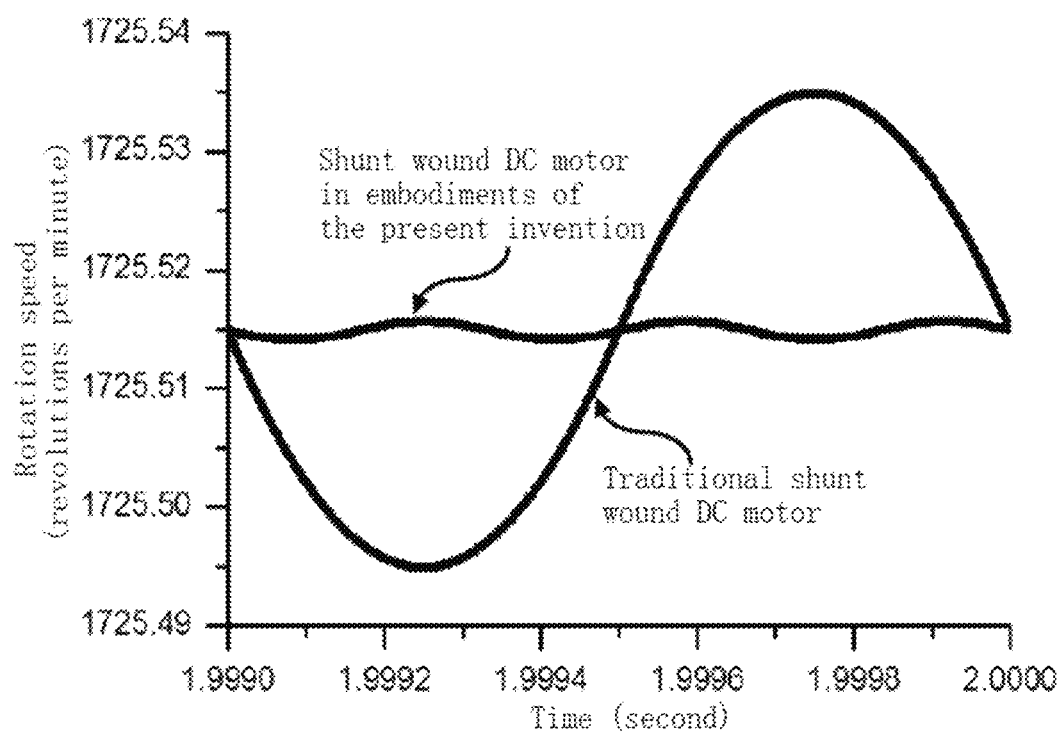
FIG. 12 is a comparison diagram of a rotation speed of a shunt wound DC motor in embodiments of the present invention and a rotation speed of a traditional shunt wound DC motor.

FIG. 7 is an input current waveform graph of three pairs of electric brushes of a shunt wound DC motor in the embodiments of the present invention; FIG. 8 is an input current waveform graph of three exciting winding units of a shunt wound DC motor in the embodiments of the present invention; FIG. 9 is a comparison diagram of armature current of a shunt wound DC motor in the embodiments of the present invention and armature current of a traditional shunt wound DC motor; FIG. 10 is a comparison diagram of exciting current of a shunt wound DC motor in embodiments of the present invention and exciting current of a traditional shunt wound DC motor; FIG. 11 is a comparison diagram of a torque of a shunt wound DC motor in the embodiments of the present invention and a torque of a traditional shunt wound DC motor; and FIG. 12 is a comparison diagram of a rotation speed of a shunt wound DC motor in the embodiments of the present invention and a rotation speed of a traditional shunt wound DC motor.

In a stable state, the peak value of the current ripple peak is the difference of a maximum value and a minimum value; and a ripple factor is a percentage of the peak value to the mean. The peak value and the ripple factor are described below when the current ripple of the output current has the same frequency but the phases are staggered by ⅓ switching cycle in sequence and the switching frequency of the three electric brushes A1B1, A2B2 and A3B3 and the chopper is 1 KHz.

As shown in FIG. 7, the peak values of the input current ripples of the three pairs of electric brushes A1B1, A2B2 and A3B3 in the shunt wound DC motor in the present embodiment 1 are all equal to 99.31−87.33=11.99 amperes; the mean of the input current is equal to 93.32 amperes; and the ripple factor is equal to 11.99/93.32×100%=12.84%.

As shown in FIG. 8, the peak values of input current ripples of the three exciting winding units 1221, 1222 and 1223 in the shunt wound DC motor in the present embodiment 1 is equal to 61.97−61.37=0.60 amperes; the mean of the current ripple is equal to 61.67 amperes; and the ripple factor is equal to 0.60/61.67×100%=0.97%.

As shown in FIG. 9, in the stable state, the armature current of the shunt wound DC motor in the present embodiment 1 is equal to the sum of the current of the three pairs of electric brushes A1B1, A2B2 and A3B3; the armature current ripple is equal to 281.95−277.98=3.97 amperes; the mean of the ripple is equal to 279.97 amperes; and the ripple factor is equal to 3.97/279.97×100%=1.42%. The armature current ripple of the traditional shunt wound DC motor is equal to 297.94−261.98=35.96 amperes; the mean of the ripple is equal to 279.97 amperes; and the ripple factor is equal to 35.96/279.97×100%=12.84%. Although the shunt wound DC motor in the present embodiment 1 and the traditional shunt wound DC motor have the same mean of the armature current, the armature current ripple and the ripple factor of the shunt wound DC motor in the present embodiment are only one ninth of the traditional shunt wound DC motor.

As shown in FIG. 10, in the stable state, exciting current of the shunt wound DC motor in the present embodiment 1 is equal to the sum of the current of the three exciting winding units 1221, 1222 and 1223; the peak value of the ripple peak of the exciting current is equal to 185.10−184.90=0.2 amperes; the mean of the ripple is equal to 185.0 amperes; and the ripple factor is equal to 0.2/185×100%=0.11%. The armature current ripple of the traditional shunt wound DC motor is equal to 185.9−184.1=1.8 amperes; the mean is equal to 185.0 amperes; and the ripple factor is equal to 1.8/185.0×100%=0.97%. Although the shunt wound DC motor in the present embodiment 1 and the traditional shunt wound DC motor have the same mean of the exciting current, the exciting current ripple and the ripple factor of the shunt wound DC motor in the present embodiment 1 are only one ninth of the traditional shunt wound DC motor.

It is known that electromagnetic torque and motion equations of the shunt wound DC motor are as follows:

$$\begin{cases} T_{em} = C_T \Phi I_a = L_{af} I_f I_a & (1) \\ T_{em} - T_{load} = J \dfrac{d}{dt} \Omega & (2) \end{cases}$$

In the equations, $T_{em}$ is an electromagnetic torque; $C_T$ is a torque constant; $\Phi$ is flux of a main magnetic field; $L_{af}$ is mutual inductance of the exciting winding part and the armature winding and is a constant; $I_f$ is the exciting current; $I_a$ is the armature current; $T_{load}$ is a load torque; J is a rotational inertia of the load and is a constant; and $\Omega$ is angular output velocity.

In the present embodiment 1, the input current of the shunt wound DC motor is equal to the sum of the armature current and the exciting current; and rated input current of the shunt wound DC motor is the maximum input current of the motor in a rated operating state.

In the equation (1), the electromagnetic torque $T_{em}$ is in direct proportion to a product of the armature current $I_a$ and the flux $\Phi$ of the main magnetic field; and the main magnetic field of the DC motor is excited by the exciting winding part powered by the chopper. It can be seen from the equation (1) that, the electromagnetic torque $T_{em}$ is in direct proportion to the product of the armature current $I_a$ and the exciting current $I_f$ and according to the ripple factor of the exciting current $I_f$ and the ripple factor of the armature current $I_a$, the electromagnetic torque $T_{em}$ produces a larger ripple factor; the angular output velocity $\Omega$ has larger pulsation or ripple; and the performances of the driving device and the electrical equipment are poorer.

In the present embodiment 1, $L_{af}$ is equal to 1. In the stable state, as shown in FIG. 11, the peak value of torque ripple peaks of the shunt wound DC motor in the present embodiment 1 is equal to 52188.25−51398.38=789.87 N·m; the mean is equal to 51793.56 N·m; and the ripple factor is equal to 1.53%. The peak value of torque ripple peaks of the traditional shunt wound DC motor is equal to 55386.15−48229.93=7156.21 N·m; the mean is equal to 51798.89 N·m; and the ripple factor is equal to 13.82%.

As shown in FIG. 12, in the stable state, the peak value of the rotation speed ripple of the shunt wound DC motor 10 in the present embodiment 1 is equal to 1725.5157−1725.5142=0.0015 revolutions per minute; the mean is equal to 1725.515 revolutions per minute; and the ripple factor is equal to 0.000087%. The peak value of the rotation speed ripple of the traditional shunt wound DC motor is equal to 1725.535−1725.4949=0.0401 revolutions per minute; the mean is equal to 1725.515 revolutions per minute; and the ripple factor is equal to 0.002324%. Although the shunt wound DC motor 10 in the present embodiment 1 and the traditional shunt wound DC motor have the same mean of the rotation speed, a ratio of the peak value of the rotation speed ripple peak and the ripple factor of the shunt wound DC motor 10 in the present embodiment 1 to those in the traditional shunt wound DC motor is 1/26.7.

In other words, although the shunt wound DC motor 10 in the present embodiment 1 has basically the same mean of the torque as the traditional shunt wound DC motor, the peak value of the torque ripple peak and the ripple factor of the shunt wound DC motor 10 in the present embodiment 1 are only one ninth of the traditional shunt wound DC motor, thereby decreasing the peak value of the output torque ripple peak and the ripple factor of the motor and further decreasing the peak value of the output rotation speed ripple and the ripple factor of the motor. The rotation speed ripple factor of the shunt wound DC motor 10 in the present embodiment 1 is only 1/26 that of the traditional shunt wound DC motor. Finally, purposes of decreasing electromagnetic interference, vibration and noise of the motor and increasing the performances of the shunt wound DC motor and the driving device are achieved.

Variation Example 1

In the present variation example 1, with respect to the same structure as embodiment 1, the same symbol is given, and the same description is omitted.

Figure 13:
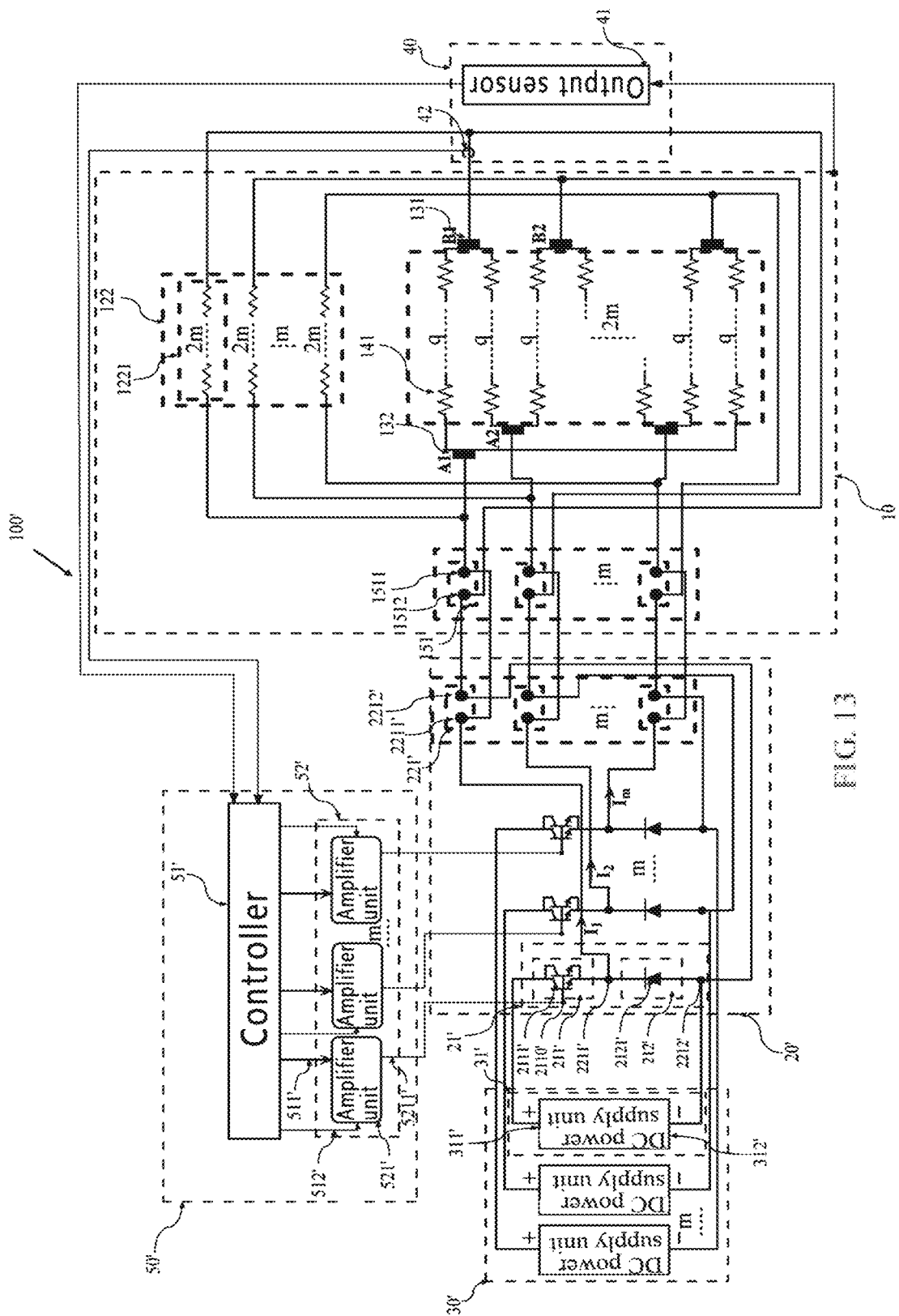
FIG. 13 is a schematic diagram of circuit connection of a shunt wound DC motor driving device in variation example 1 of the present invention.

FIG. 13 is a schematic diagram of circuit connection of a shunt wound DC motor driving device in variation example 1 of the present invention.

As shown in FIG. 13, a shunt wound DC motor driving device 100' in the present variation example 1 includes a shunt wound DC motor 10, a chopper 20', a DC power supply 30', a sensing part 40 and a control part 50'.

As shown in FIG. 13, the chipper 20' is composed of m chopping units 21' that respectively correspond to m pairs of electric brushes 13.

Each of the chopping units 21' includes an upper bridge arm 211' and a lower bridge arm 212' connected with each other in series, and a first power output end 2211' and a second power output end 2212'.

Each upper bridge arm 211' includes p power switch tubes 2111' connected in a one-to-one correspondence manner in parallel, and switching control ends 2110', wherein p is a positive integer of being not greater than 2. Each lower bridge arm 212' includes 1 fly-wheel diode 2121'. Each of the power switch tubes 2111' is provided with a control pole; and all the control poles in each upper bridge arm 211' form the switching control ends 2110'.

When all the power switch tubes 2111' have the same maximum output current $I_1$, and the maximum current of the shunt wound DC motor 10 is $I_{max}$, the m meets the following condition: $m > I_{max} \div (k \times p \times I_1)$, wherein k is a parallel connection coefficient, and $1/p < k < 1$.

In the present variation example 1, the p is equal to 2-4; the parallel connection technology is mature and reliable; the quantity of the m can be properly decreased; workloads and complexity in production and manufacture are decreased; and cost performance of the product is increased.

The first power output end 2211' is arranged between the upper bridge arm 211' and the lower bridge arm 212'; and the second power output end 2212' is arranged at the connection end of the lower bridge arm 212' and the DC power supply 30'. The m first power output ends 2211' of all the chopping units 21' and the m second power output ends 2212' of all the chopping units 21' respectively correspondingly form m pairs of power output terminals 221'. The m pairs of power output terminals 221' are connected with the m pairs of external wiring terminals 151 in a one-to-one correspondence manner.

As shown in FIG. 13, the DC power supply 30' is provided with m mutually independent DC power supply units 31' and m pairs of power supply output terminals led out of each of the DC power supply units 31'. The m pairs of power supply output terminals are connected with the m chopping units 21' in a one-to-one correspondence manner. Each pair of the power supply output terminals includes a positive pole 311' and a negative pole 312'. The positive pole 311' is connected with the upper bridge arm 211' in the corresponding chopping unit 21'; and the negative pole 312' is connected with the lower bridge arm 212' in the corresponding chopping unit 21'.

As shown in FIG. 13, the control part 50' includes a controller 51' and an amplifier 52'.

The controller 51' calculates generation according to the external instruction signal and the output feedback signal and the current feedback signal of the sensing part 40 and outputs a control signal 511' and an enable signal 512' to the amplifier 52'. The control signal 511' includes m switching control signals that respectively correspond to the m chopping units 21' and are formed according to a preset phase stagger rule; and the enable signal 512' is used for controlling an operating state of the amplifier 52'.

The amplifier 52' enters the operating state under control of the enable signal 512', amplifies the m switching control signals and correspondingly provides the m switching control signals for the m switching control ends 2110'. The amplifier 52' is provided with m mutually independent amplifier units 521'. The m amplifier units 521' respectively correspond to the m chopping units 21'. Each of the amplifier units 521' is provided with an amplified signal output end 5211'. The m amplified signal output ends 5211' are connected with the m switching control ends 2110' in a one-to-one correspondence manner.

Embodiment 2

In the present embodiment 2, with respect to the same structure as the embodiment 1, the same symbol is given, and the same description is omitted.

Figure 14:
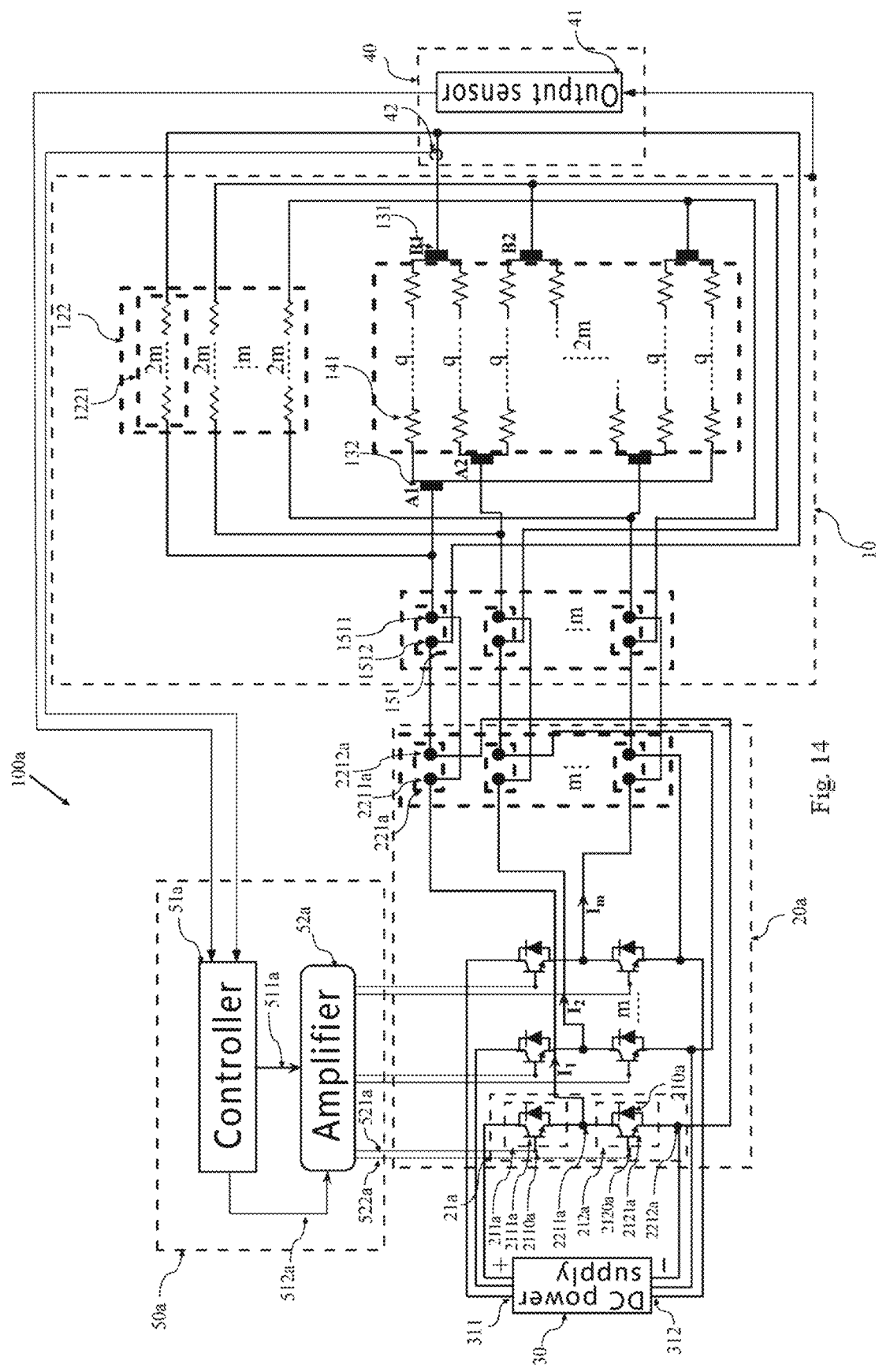
FIG. 14 is a schematic diagram of circuit connection of a shunt wound DC motor driving device in embodiment 2 of the present invention.
Figure 15:
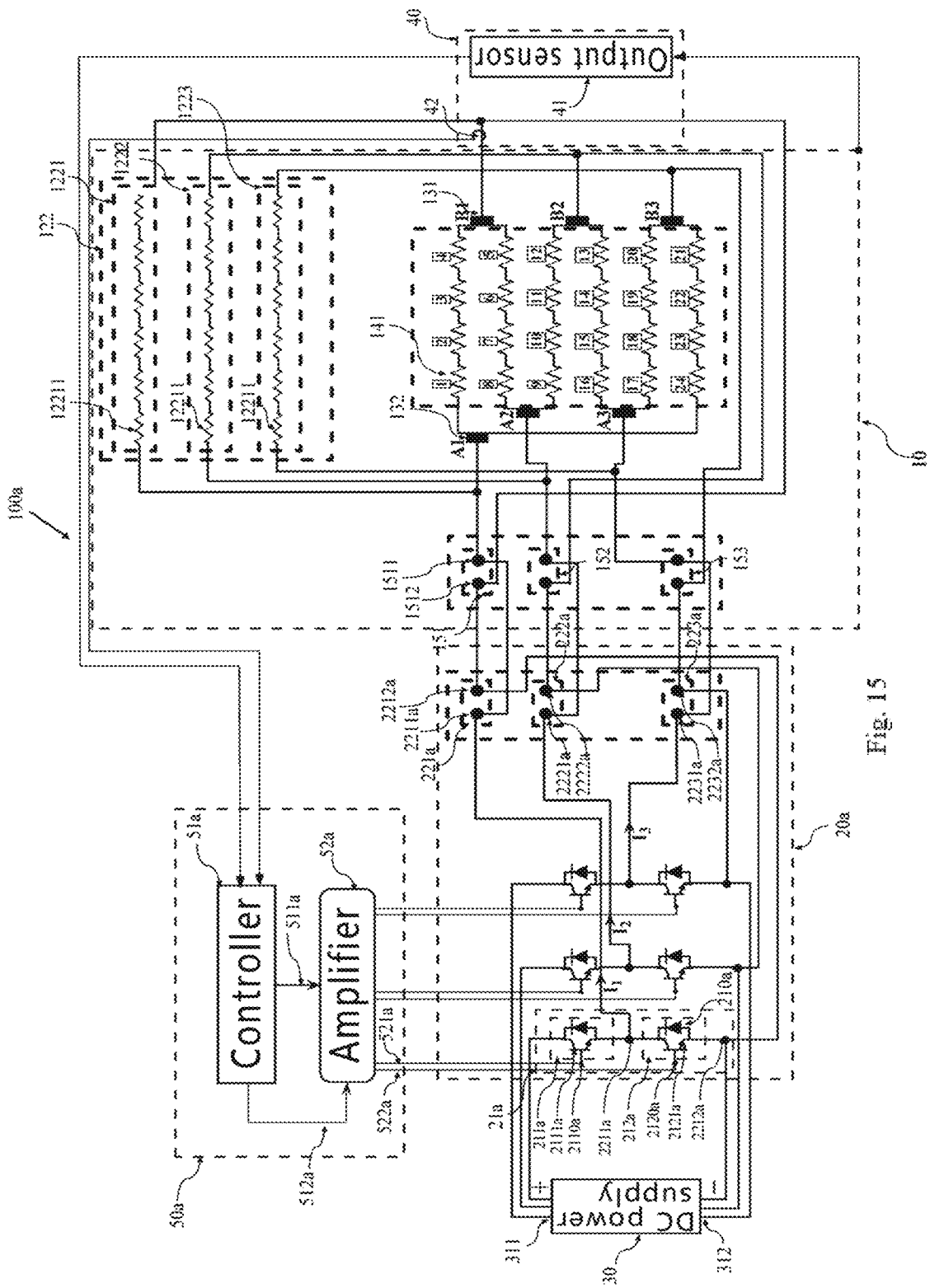
FIG. 15 is a schematic diagram of circuit connection of a shunt wound DC motor driving device in embodiment 2 of the present invention when m is equal to 3.

FIG. 14 is a schematic diagram of circuit connection of a shunt wound DC motor driving device in embodiment 2 of the present invention; and FIG. 15 is a schematic diagram of circuit connection of a shunt wound DC motor driving device in embodiment 2 of the present invention when m is equal to 3.

As shown in FIGS. 14 and 15, a shunt wound DC motor driving device 100a in the present embodiment 2 includes a shunt wound DC motor 10, a chopper 20a, a DC power supply 30, a sensing part 40 and a control part 50a.

As shown in FIG. 14, the chopper 20a converts a constant voltage of the DC power supply 30 into an average voltage controllable variable voltage based on a control signal transmitted by the control part 50a and provides the variable voltage for the shunt wound DC motor 10. The chopper 20a includes m chopping units 21a that respectively correspond to the m pairs of electric brushes 13. In the present embodiment 2, as show in FIG. 15, the chopper 20a includes 3 chopping units 21a.

Each of the chopping units 21a includes an upper bridge arm 211a and a lower bridge arm 212a connected with each other in series, and a first power output end 2211a and a second power output end 2212a.

Each upper bridge arm 211a includes 1 power switch tube 2111a, a diode 210a in reverse parallel connection with the power switch tube 2111a, and an upper bridge arm switching control end 2110a; and each lower bridge arm 212a includes 1 power switch tube 2121a, a diode 210a in reverse parallel connection with the power switch tube 2111a, and a lower bridge arm switching control end 2120a.

When the power switch tubes 2111a of all the upper bridge arms 211a and the power switch tubes 2121a of all the lower bridge arms 212a have the same maximum output current $I_1$, and the maximum current of the shunt wound DC motor 10 is $I_{max}$, the m meets the following condition: $m > I_{max} \div I_1$.

In the present embodiment 2, all the power switch tubes are half-controlled or full-controlled devices. The half-controlled devices are ordinary thyristors; and the full-controlled devices are any one of power field effect transistors, gate-turn-off thyristors, integrated gate-commutated thyristors, insulated gate bipolar transistors and power bipolar transistors.

As shown in FIG. 14, the first power output end 2211a is arranged between the upper bridge arm 211a and the lower bridge arm 212a; and the second power output end 2212a is arranged at the connection end of the lower bridge arm 212a and the DC power supply 30. The m first power output ends 2211a of all the chopping units 21a and the m second power output ends 2212a of all the chopping units 21a correspondingly form m pairs of power output terminals 221a; and the m pairs of power output terminals 221a are connected with the m pairs of external wiring terminal 151 in a one-to-one correspondence manner.

In the present embodiment 2, as shown in FIG. 15, the first power output end 2211a and the second power output end 2212a correspondingly form 1 pair of power output terminals 221a; the first power output end 2221a and the second power output end 2222a correspondingly form 1 pair of power output terminals 222a; the first power output end 2231a and the second power output end 2232a correspondingly form 1 pair of power output terminals 223a; and the 3 pairs of power output terminals 221a, 222a and 223a are connected with the 3 pairs of external wiring terminals 151, 152 and 153 in a one-to-one correspondence manner.

As shown in FIGS. 14 and 15, the DC power supply 30 is provided with m pairs of power supply output terminals that are connected with the m chopping units 21a in a one-to-one correspondence manner. The positive pole 311 in each pair of the power supply output terminals is connected with the upper bridge arm 211a in the corresponding chopping unit 21a; and the negative pole 312 is connected with the lower bridge arm 212a in the corresponding chopping unit 21a.

As shown in FIGS. 14 and 15, the control part 50a includes a controller 51a and an amplifier 52a.

The controller 51a calculates generation according to the external instruction signal and the output feedback signal and the current feedback signal of the sensing part 40 and outputs a control signal 511a and an enable signal 512a to the amplifier 52a. The control signal 511a includes m unit control signals that respectively correspond to the m chopping units 21a and are formed according to a preset phase stagger rule; each of the unit control signals includes two switching control signals 512a and 522a that correspond to the two switching control ends 2110a and 2120a in the corresponding chopping units 21a; and the enable signal 512a is used for controlling an operating state of the amplifier 52a.

The amplifier 52a enters the operating state under control of the enable signal 512a, amplifies the two switching control signals in each of the unit control signals and provides the two switching control signals for the two switching control ends 2110a and 2120a. The amplifier 52a is provided with m amplified signal output parts that correspond to the m chopping units 21a. Each of the amplified signal output parts is composed of two amplified signal output ends 521a and 522a. The two amplified signal output ends 521a and 522a of each of the amplified signal output parts are respectively correspondingly connected with the two switching control ends 2110a and 2120a in the corresponding chopping units 21a, i.e., the amplified signal output end 521a is connected with the upper bridge arm switching control end 2110a; and the amplified signal output end 522a is connected with the lower bridge arm switching control end 2120a.

In the present embodiment 2, the preset phase stagger rule is as follows: the m phases that respectively correspond to the m unit control signals serve as m preset phases and are staggered by 1/m switching cycle in sequence. In each of the chopping units, the switching control signal that corresponds to the upper bridge arm switching control end is set as a reference switching control signal; and a phase of the reference switching control signal is set according to the preset phase that corresponds to the unit control signal. The switching control signal that corresponds to the lower bridge arm switching control end is set reciprocal to the reference switching control signal, so that peak values of ripple peaks of the superposed current ripples of the output current of the power output terminals of the m chopping units are decreased, thereby decreasing peak values of ripple peaks of the output torque and the rotation speed, further increasing the performance of the shunt wound DC motor and prolonging service life of the motor. Certainly, according to the needs, when the m is the even number, the preset stagger rule is as follows: the m phases that respectively correspond to the m unit control signals serve as the m preset phases and are staggered by 2/m switching cycle in sequence. Thus, the output current of the power output terminals of every two chopping units corresponding to every two pairs of the electric brushes with opposite spatial positions has the same current ripples, thereby producing a couple moment in the motor, avoiding a friction moment between a shaft and a bearing caused by the reason that the torque ripple output by the motor cannot form the couple moment, decreasing wear between the shaft and the bearing, increasing the performance of the motor and prolonging the service life of the motor.

The peak value and the ripple factor are described below when the current ripple of the output current has the same frequency but the phases are staggered by ⅓ switching cycle in sequence and the switching frequency of the three electric brushes A1B1, A2B2 and A3B3 and the chopper is 1 KHz.

As shown in FIG. 7, the peak values of the input current ripples of the three pairs of electric brushes A1B1, A2B2 and A3B3 in the shunt wound DC motor in the present embodiment 2 are all equal to 99.31−87.33=11.99 amperes; the mean of the input current is equal to 93.32 amperes; and the ripple factor is equal to 11.99/93.32×100%=12.84%.

As shown in FIG. 8, the peak values of input current ripples of the three exciting winding units 1221, 1222 and 1223 in the shunt wound DC motor in the present embodiment 2 is equal to 61.97−61.37=0.60 amperes; the mean of the current ripple is equal to 61.67 amperes; and the ripple factor is equal to 0.60/61.67×100%=0.97%.

As shown in FIG. 9, in the stable state, the armature current of the shunt wound DC motor in the present embodiment 2 is equal to the sum of the current of the three pairs of electric brushes A1B1, A2B2 and A3B3; the armature current ripple is equal to 281.95−277.98=3.97 amperes; the mean of the ripple is equal to 279.97 amperes; and the ripple factor is equal to 3.97/279.97×100%=1.42%. The armature current ripple of the traditional shunt wound DC motor is equal to 297.94−261.98=35.96 amperes; the mean of the ripple is equal to 279.97 amperes; and the ripple factor is equal to 35.96/279.97×100%=12.84%. Although the shunt wound DC motor in the present embodiment 2 and the traditional shunt wound DC motor have the same mean of the armature current, the armature current ripple and the ripple factor of the shunt wound DC motor in the present embodiment 2 are only one ninth of the traditional shunt wound DC motor.

As shown in FIG. 10, in the stable state, exciting current of the shunt wound DC motor in the present embodiment 2 is equal to the sum of the current of the three exciting winding units 1221, 1222 and 1223; the peak value of the ripple peak of the exciting current is equal to 185.10−184.90=0.2 ampere; the mean of the ripple is equal to 185.0 amperes; and the ripple factor is equal to 0.2/185×100%=0.11%. The armature current ripple of the traditional shunt wound DC motor is equal to 185.9−184.1=1.8 amperes; the mean is equal to 185.0 amperes; and the ripple factor is equal to 1.8/185.0×100%=0.97%. Although the shunt wound DC motor in the present embodiment 2 and the traditional shunt wound DC motor have the same mean of the exciting current, the exciting current ripple and the ripple factor of the shunt wound DC motor in the present embodiment 2 are only one ninth of the traditional shunt wound DC motor.

In the present embodiment 2, $L_{af}$ is equal to 1. In the stable state, as shown in FIG. 11, the peak value of torque ripple peaks of the shunt wound DC motor in the present embodiment 2 is equal to 52188.25−51398.38=789.87 N·m; the mean is equal to 51793.56 N·m; and the ripple factor is equal to 1.53%. The peak value of torque ripple peaks of the traditional shunt wound DC motor is equal to 55386.15−48229.93=7156.21 N·m; the mean is equal to 51798.89 N·m; and the ripple factor is equal to 13.82%.

As shown in FIG. 12, in the stable state, the peak value of the rotation speed ripple of the shunt wound DC motor 10 in the present embodiment 2 is equal to 1725.5157−1725.5142=0.0015 revolutions per minute; the mean is equal to 1725.515 revolutions per minute; and the ripple factor is equal to 0.000087%. The peak value of the rotation speed ripple of the traditional shunt wound DC motor is equal to 1725.535−1725.4949=0.0401 revolutions per minute; the mean is equal to 1725.515 revolutions per minute; and the ripple factor is equal to 0.002324%. Although the shunt wound DC motor 10 in the present embodiment 2 and the traditional shunt wound DC motor have the same mean of the rotation speed, a ratio of the peak value of the rotation speed ripple peak and the ripple factor of the shunt wound DC motor 10 in the present embodiment 2 to those in the traditional shunt wound DC motor is 1/26.7.

In other words, although the shunt wound DC motor 10 in the present embodiment 2 has basically the same mean of the torque as the traditional shunt wound DC motor, the peak value of the torque ripple peak and the ripple factor of the shunt wound DC motor 10 in the present embodiment 2 are only one ninth of the traditional shunt wound DC motor, thereby decreasing the peak value of the output torque ripple peak and the ripple factor of the motor and further decreasing the peak value of the output rotation speed ripple and the ripple factor of the motor. The rotation speed ripple factor of the shunt wound DC motor in the present embodiment 2 is only 1/26 that of the traditional shunt wound DC motor. Finally, purposes of decreasing electromagnetic interference, vibration and noise of the motor and increasing the performances of the shunt wound DC motor and the driving device are achieved.

Variation Example 2

In the present variation example 2, with respect to the same structure as embodiment 2, the same symbol is given, and the same description is omitted.

Figure 16:
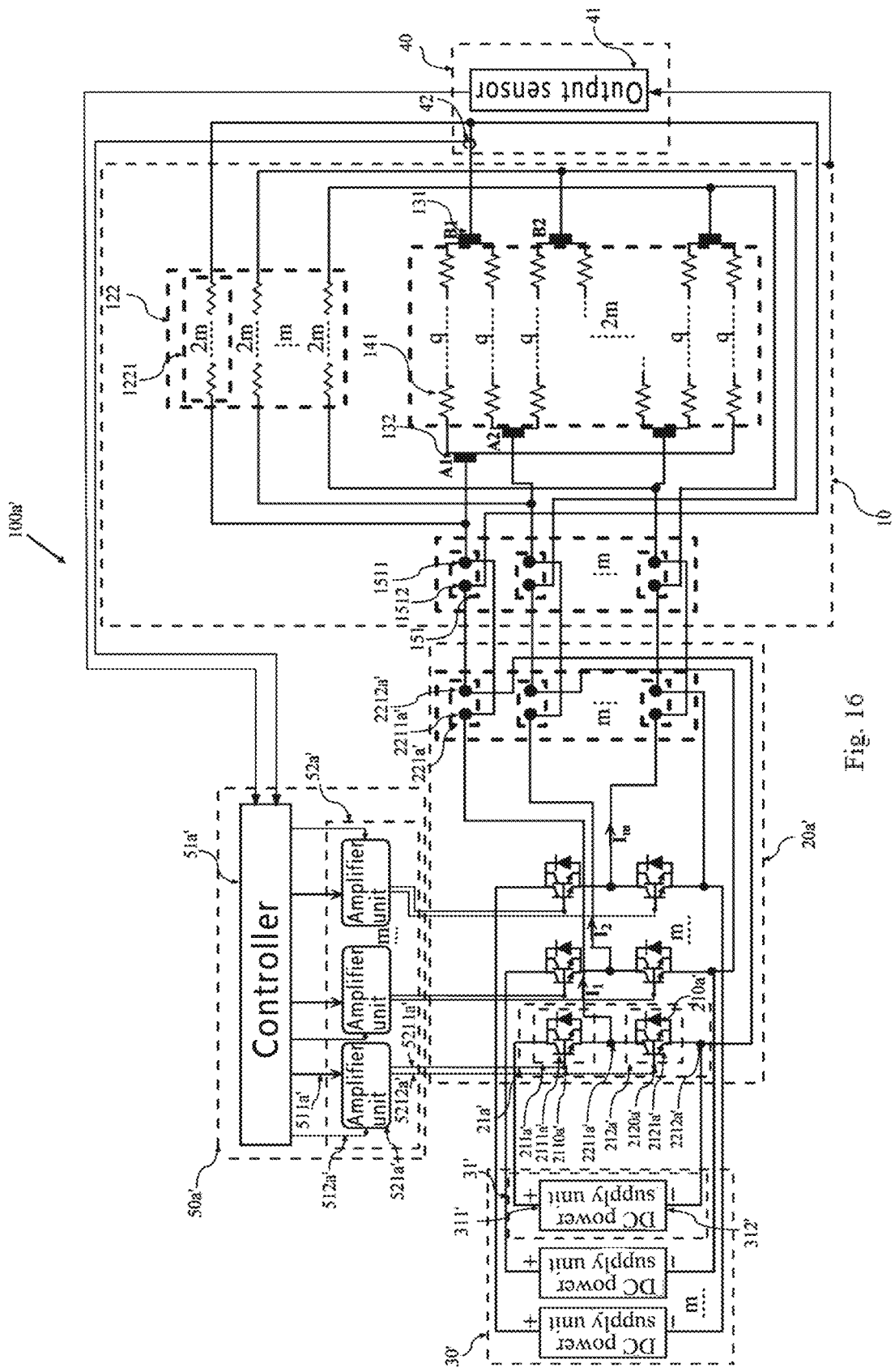
FIG. 16 is a schematic diagram of circuit connection of a shunt wound DC motor driving device in variation example 2 of the present invention.

FIG. 16 is a schematic diagram of circuit connection of a shunt wound DC motor driving device in variation example 2 of the present invention.

As shown in FIG. 16, a shunt wound DC motor driving device 100a' in the present variation example includes a shunt wound DC motor 10, a chopper 20a', a DC power supply 30', a sensing part 40 and a control part 50a'.

As shown in FIG. 16, the chopper 20a' is composed of m chopping units 21a' that respectively correspond to m pairs of electric brushes 13.

Each of the chopping units 21a' includes an upper bridge arm 211a' and a lower bridge arm 212a' connected with each other in series, and a first power output end 2211a' and a second power output end 2212a'.

Each upper bridge arm 211a' includes p power switch tubes 2111a' connected in a one-to-one correspondence manner in parallel, diodes 210a' in reverse parallel connection with the power switch tube 2111a', and upper bridge arm switching control ends 2110a'; and each lower bridge arm 212a' includes p power switch tubes 2121a' connected in a one-to-one correspondence manner in parallel, diodes 210a' in reverse parallel connection with the power switch tube 2121a', and lower bridge arm switching control ends 2120a', wherein p is a positive integer of being not greater than 2. Each of the power switch tubes is provided with a control pole; all the control poles in each upper bridge arm 211a' form the upper bridge arm switching control ends 2110a'; and all the control poles in each lower bridge arm 212a' form the lower bridge arm switching control ends 2120a'.

When all the power switch tubes 2111a' of the upper bridge arms 211a' and all the power switch tubes 2121a' of the lower bridge arms 212a' have the same maximum output current $I_1$, and the maximum current of the shunt wound DC motor 10 is Liu, the m meets the following condition: $m > I_{max} \pm (k \times p \times I_1)$, wherein k is a parallel connection coefficient, and $1/p < k < 1$.

In the present variation example 2, the p is equal to 2-4; the parallel connection technology is mature and reliable; the quantity of the m can be properly decreased; workloads and complexity in production and manufacture are decreased; and cost performance of the product is increased.

The first power output end 2211a' is arranged between the upper bridge arm 211a' and the lower bridge arm 212a'; and the second power output end 2212a' is arranged at the connection end of the lower bridge arm 212a' and the DC power supply 30'. The m first power output ends 2211a' of all the chopping units 21a' and the m second power output ends 2212a' of all the chopping units 21a' respectively correspondingly form m pairs of power output terminals 221a'. The m pairs of power output terminals 221a' are connected with the m pairs of external wiring terminals 151 in a one-to-one correspondence manner.

As shown in FIG. 16, the DC power supply 30' is provided with m mutually independent DC power supply units 31' and m pairs of power supply output terminals led out of each of the DC power supply units 31'. The m pairs of power supply output terminals are connected with the m chopping units 21a' in a one-to-one correspondence manner Each pair of the power supply output terminals includes a positive pole 311' and a negative pole 312'. The positive pole 311' is connected with the upper bridge arm 211a' in the corresponding chopping unit 21a'; and the negative pole 312' is connected with the lower bridge arm 212a' in the corresponding chopping unit 21a'.

As shown in FIG. 16, the control part 50a' includes a controller 51a' and an amplifier 52a'.

The controller 51a' calculates generation according to the external instruction signal and the output feedback signal and the current feedback signal of the sensing part 40 and outputs a control signal 511a' and an enable signal 512a' to the amplifier 52a'. The control signal 511a' includes m unit control signals that respectively correspond to the m chopping units 21a' and are formed according to a preset phase stagger rule; each of the unit control signals includes two switching control ends 2110a' and 2120a' in the corresponding chopping unit 21a'; and the enable signal 512a' is used for controlling an operating state of the amplifier 52a'.

The amplifier 52a' enters the operating state under control of the enable signal 512a', amplifies the two switching control signals in each of the unit control signals and correspondingly provides the two switching control signals for the two switching control ends 2110a' and 2120a'. The amplifier 52a' is provided with m mutually independent amplifier units 521a'. The m amplifier units 521a' respectively correspond to the m chopping units 21a'. Each of the amplifier units 521a' is provided with an amplified signal output end. Each amplified signal output part is composed of two amplified signal output ends 5211a' and 5212a'. The two amplified signal output ends 5211a' and 5212a' of each amplified signal output part are respectively correspondingly connected with the two switching control ends 2110a' and 2120a' in the corresponding chopping unit 21a', i.e., the amplified signal output end 5211a' is connected with the upper bridge arm switching control end 2110a', and the amplified signal output end 5212a' is connected with the lower bridge arm switching control end 2120a'.

Embodiment 3

In the present embodiment 3, with respect to the same structure as the embodiment 1, the same symbol is given, and the same description is omitted.

Figure 17:
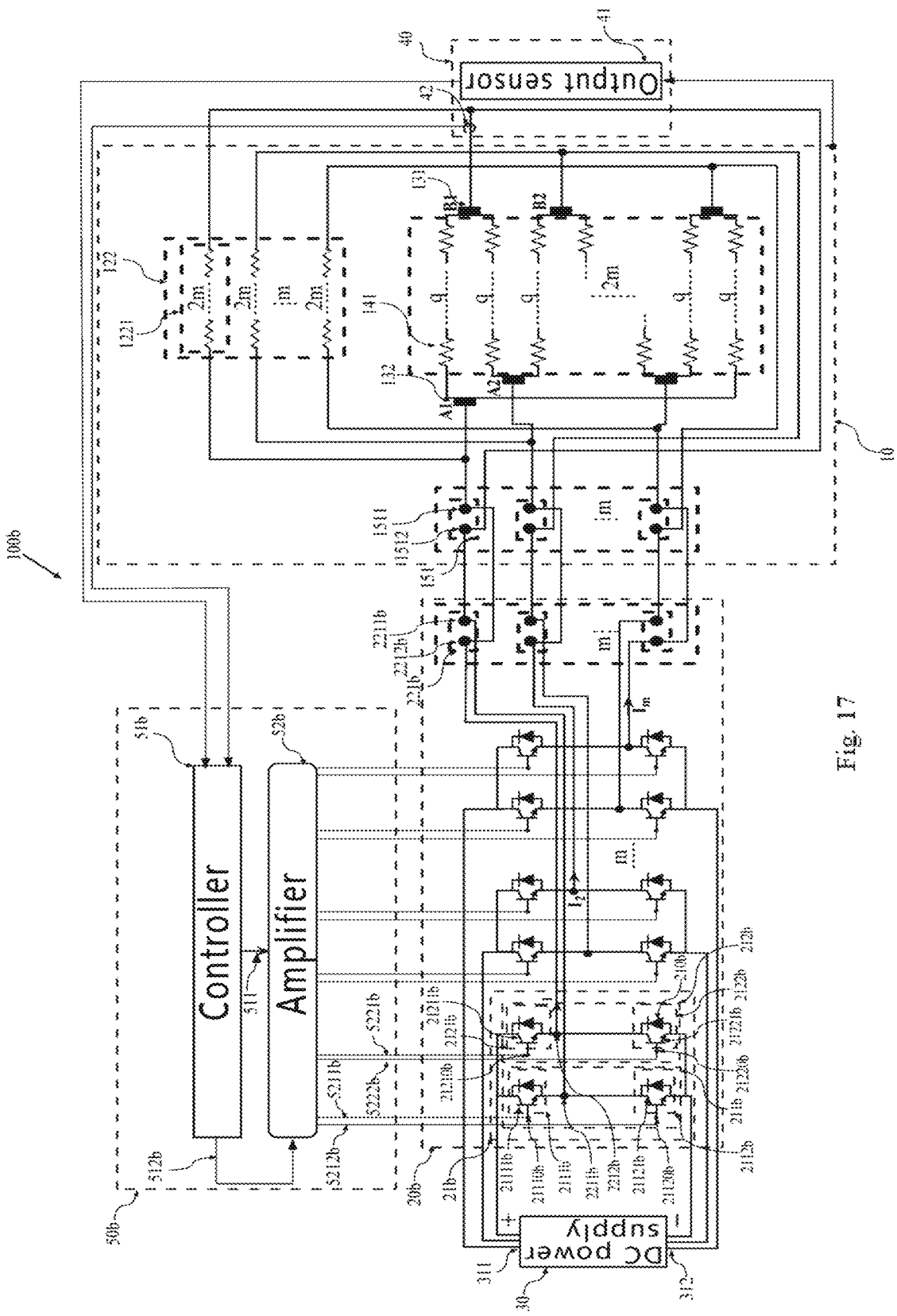
FIG. 17 is a schematic diagram of circuit connection of a shunt wound DC motor driving device in embodiment 3 of the present invention.

FIG. 17 is a schematic diagram of circuit connection of a shunt wound DC motor driving device in embodiment 3 of the present invention.

Figure 18:
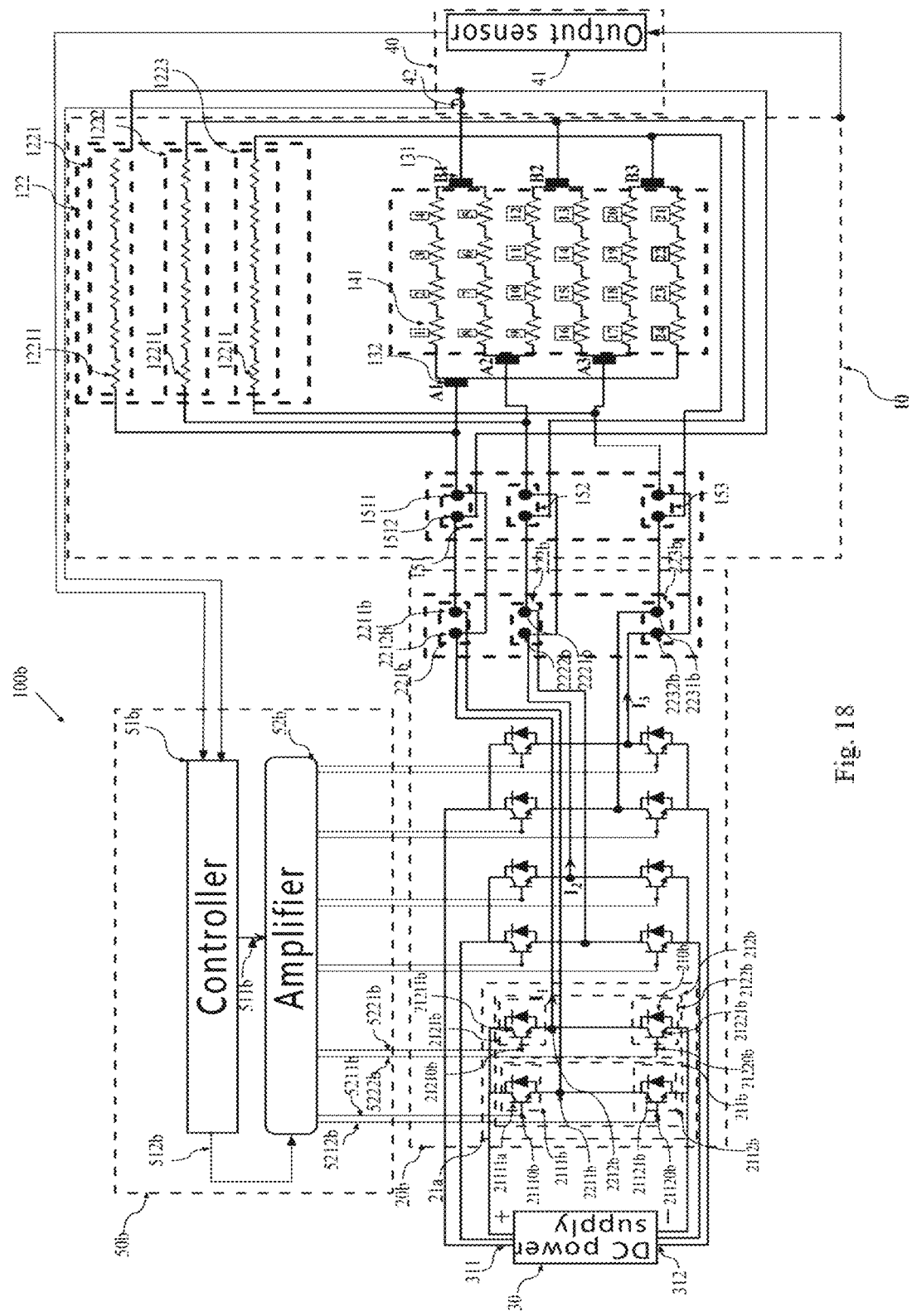
FIG. 18 is a schematic diagram of circuit connection of a shunt wound DC motor driving device in embodiment 3 of the present invention when m is equal to 3.

As shown in FIGS. 17 and 18, a shunt wound DC motor driving device 100b in the present embodiment 3 includes a shunt wound DC motor 10, a chopper 20b, a DC power supply 30, a sensing part 40 and a control part 50b.

As shown in FIG. 17, the chopper 20b converts a constant voltage of the DC power supply 30 into an average voltage controllable variable voltage based on a control signal transmitted by the control part 50b and provides the variable voltage for the shunt wound DC motor 10. The chopper 20b includes m chopping units 21b that respectively correspond to the m pairs of electric brushes 13. In the present embodiment, as show in FIG. 18, the chopper 20b includes 3 chopping units 21b.

Each of the chopping units 21b includes a first bridge arm 211b and a second bridge arm 212b, and a first power output end 2211b and a second power output end 2212b. The first bridge arm 211b includes a first upper bridge arm 2111b and a first lower bridge arm 2112b connected in series with each other; the second bridge arm 212b includes a second upper bridge arm 2121b and a second lower bridge arm 2122b connected in series with each other; and the first bridge arm 211b and the second bridge arm 212b are connected in parallel with each other. The first upper bridge arm 2111b includes a power switch tube 21111b, a diode 210b in reverse parallel connection with the power switch tube, and a switching control end 21110b; the first lower bridge arm 2112b includes a power switch tube 21121b, a diode 210b in reverse parallel connection with the power switch tube, and a switching control end 21120b; the second upper bridge arm 2121b includes a power switch tube 21211b, a diode 210b in reverse parallel connection with the power switch tube, and a switching control end 21210b; and the second lower bridge arm 2122b includes a power switch tube 21221b, a diode 210b in reverse parallel connection with the power switch tube, and a switching control end 21220b.

When the power switch tubes 21111b of all the first upper bridge arms 2111b, the power switch tubes 21121b of all the first lower bridge arms 2112b, the power switch tubes 21211b of all the second upper bridge arms 2121b and the power switch tubes 21221b of all the second lower bridge arms 2122b have the same maximum output current $I_1$, and the maximum current of the shunt wound DC motor 10 is $I_{max}$, the m meets the following condition: $m > I_{max} \div I_1$.

In the present embodiment 3, all the power switch tubes are half-controlled or full-controlled devices. The half-controlled devices are ordinary thyristors; and the full-controlled devices are any one of power field effect transistors, gate-turn-off thyristors, integrated gate-commutated thyristors, insulated gate bipolar transistors and power bipolar transistors.

As shown in FIG. 17, the first power output end 2211b is arranged between the first upper bridge arm 2111b and the first lower bridge arm 2112b; and the second power output end 2212b is arranged between the second upper bridge arm 2121b and the second lower bridge arm 2122b. The m first power output ends 2211b of all the chopping units 21b and the m second power output ends 2212b of all the chopping units 21b correspondingly form m pairs of power output terminals 221b; and the m pairs of power output terminals 221b are connected with the m pairs of external wiring terminal 151 in a one-to-one correspondence manner.

In the present embodiment, as shown in FIG. 18, the first power output end 2211b and the second power output end 2212b correspondingly form 1 pair of power output terminals 221b; the first power output end 2221b and the second power output end 2222b correspondingly form 1 pair of power output terminals 222b; the first power output end 2231b and the second power output end 2232b correspondingly form 1 pair of power output terminals 223b; and the 3 pairs of power output terminals 221b, 222b and 223b are connected with the 3 pairs of external wiring terminals 151, 152 and 153 in a one-to-one correspondence manner.

As shown in FIGS. 17 and 18, the DC power supply 30 has a constant voltage corresponding to a rated voltage of the shunt wound DC motor 10, and is provided with m pairs of power supply output terminals that are connected with the m chopping units 21b in a one-to-one correspondence manner. Each pair of the power supply output terminals includes a positive pole 311 and a negative pole 312; the positive poles 311 are connected with the first upper bridge arms 2111b and the second upper bridge arms 2121b in the corresponding chopping units 21b; and the negative poles 312 are connected with the first lower bridge arms 2112b and the second lower bridge arms 2122b in the corresponding chopping units 21b.

As shown in FIGS. 17 and 18, the control part 50b includes a controller 51b and an amplifier 52b.

The controller 51b calculates generation according to the external instruction signal and the output feedback signal and the current feedback signal of the sensing part 40 and outputs a control signal 511b and an enable signal 512b to the amplifier 52b. The control signal 511b includes m unit control signals that respectively correspond to the m chopping units 21b and are formed according to a preset phase stagger rule; each of the unit control signals includes four switching control signals 5211b, 5212b, 5221b and 5222b that correspond to four switching control ends 21110b, 21120b, 21210b and 21220b in the corresponding chopping units 21b; and the enable signal 512b is used for controlling an operating state of the amplifier 52b.

The amplifier 52b enters the operating state under control of the enable signal 512b, amplifies the four switching control signals in each of the unit control signals and provides the four switching control signals for the four switching control ends 21110b, 21120b, 21210b and 21220b. The amplifier 52b is provided with m amplified signal output parts that correspond to the m chopping units 21b. Each of the amplified signal output parts is composed of four amplified signal output ends. The four amplified signal output ends 5211b, 5212b, 5221b and 5222b of each of the amplified signal output parts are respectively correspondingly connected with the four switching control ends 21110b, 21120b, 21210b and 21220b in the corresponding chopping units 21b, i.e., the amplified signal output end 5211b is connected with the first upper bridge arm switching control end 21110b; the amplified signal output end 5212b is connected with the first lower bridge arm switching control end 21120b; the amplified signal output end 5221b is connected with the second upper bridge arm switching control end 21210b; and the amplified signal output end 5222b is connected with the second lower bridge arm switching control end 21220b.

In the present embodiment 3, the preset phase stagger rule is as follows: the m phases that respectively correspond to the m unit control signals serve as m preset phases and are staggered by 1/m switching cycle in sequence. In each of the chopping units, the two switching control signals that correspond to the first upper bridge arm switching control end and the second lower bridge arm switching control end are set as reference switching control signals; and phases of the reference switching control signals are set according to the preset phases that correspond to the unit control signals. Two switching control signals that correspond to the first lower bridge arm switching control end and the second upper bridge arm switching control end are set reciprocal to the reference switching control signals, so that peak values of ripple peaks of the superposed current ripples of the output current of the power output terminals of the m chopping units are decreased, thereby decreasing peak values of ripple peaks of the output torque and the rotation speed, further increasing the performance of the shunt wound DC motor and prolonging service life of the motor. Certainly, according to the needs, when the m is the even number, the preset stagger rule is as follows: the m phases that respectively correspond to the m unit control signals serve as the m preset phases and are staggered by 2/m switching cycle in sequence. Thus, the output current of the power output terminals of every two chopping units corresponding to every two pairs of the electric brushes with opposite spatial positions has the same current ripples, thereby producing a couple moment in the motor, avoiding a friction moment between a shaft and a bearing caused by the reason that the torque ripple output by the motor cannot form the couple moment, decreasing wear between the shaft and the bearing, increasing the performance of the motor and prolonging the service life of the motor.

The peak value and the ripple factor are described below when the current ripple of the output current has the same frequency but the phases are staggered by ⅓ switching cycle in sequence and the switching frequency of the three electric brushes A1B1, A2B2 and A3B3 and the chopper is 1 KHz.

As shown in FIG. 7, the peak values of the input current ripples of the three pairs of electric brushes A1B1, A2B2 and A3B3 in the shunt wound DC motor in the present embodiment 3 are all equal to 99.31−87.33=11.99 amperes; the mean of the input current is equal to 93.32 amperes; and the ripple factor is equal to 11.99/93.32×11.99/93.32×100%=12.84%.

As shown in FIG. 8, the peak values of input current ripples of the three exciting winding units 1221, 1222 and 1223 in the shunt wound DC motor in the present embodiment 2 is equal to 61.97−61.37=0.60 amperes; the mean of the current ripple is equal to 61.67 amperes; and the ripple factor is equal to 0.60/61.67×100%=0.97%.

As shown in FIG. 9, in the stable state, the armature current of the shunt wound DC motor in the present embodiment 3 is equal to the sum of the current of the three pairs of electric brushes A1B1, A2B2 and A3B3; the armature current ripple is equal to 281.95-277.98=3.97 amperes; the mean of the ripple is equal to 279.97 amperes; and the ripple factor is equal to 3.97/279.97×100%=1.42%. The armature current ripple of the traditional shunt wound DC motor is equal to 297.94−261.98=35.96 amperes; the mean of the ripple is equal to 279.97 amperes; and the ripple factor is equal to 35.96/279.97×100%=12.84%. Although the shunt wound DC motor in the present embodiment 3 and the traditional shunt wound DC motor have the same mean of the armature current, the armature current ripple and the ripple factor of the shunt wound DC motor in the present embodiment 3 are only one ninth of the traditional shunt wound DC motor.

As shown in FIG. 10, in the stable state, exciting current of the shunt wound DC motor in the present embodiment 3 is equal to the sum of the current of the three exciting winding units 1221, 1222 and 1223; the peak value of the ripple peak of the exciting current is equal to 185.10−184.90=0.2 amperes; the mean of the ripple is equal to 185.0 amperes; and the ripple factor is equal to 0.2/185×100%=0.11%. The armature current ripple of the traditional shunt wound DC motor is equal to 185.9−184.1=1.8 amperes; the mean is equal to 185.0 amperes; and the ripple factor is equal to 1.8/185.0×100%=0.97%. Although the shunt wound DC motor in the present embodiment 3 and the traditional shunt wound DC motor have the same mean of the exciting current, the exciting current ripple and the ripple factor of the shunt wound DC motor in the present embodiment 3 are only one ninth of the traditional shunt wound DC motor.

In the present embodiment 3, $L_{af}$ is equal to 1. In the stable state, as shown in FIG. 11, the peak value of torque ripple peaks of the shunt wound DC motor in the present embodiment 2 is equal to 52188.25−51398.38=789.87 N·m; the mean is equal to 51793.56 N·m; and the ripple factor is equal to 1.53%. The peak value of torque ripple peaks of the traditional shunt wound DC motor is equal to 55386.15−48229.93=7156.21 N·m; the mean is equal to 51798.89 N·m; and the ripple factor is 13.82%.

As shown in FIG. 12, in the stable state, the peak value of the rotation speed ripple of the shunt wound DC motor 10 in the present embodiment 3 is equal to 1725.5157-1725.5142=0.0015 revolutions per minute; the mean is equal to 1725.515 revolutions per minute; and the ripple factor is equal to 0.000087%. The peak value of the rotation speed ripple of the traditional shunt wound DC motor is equal to 1725.535-1725.4949=0.0401 revolutions per minute; the mean is equal to 1725.515 revolutions per minute; and the ripple factor is equal to 0.002324%. Although the shunt wound DC motor 10 in the present embodiment 3 and the traditional shunt wound DC motor have the same mean of the rotation speed, a ratio of the peak value of the rotation speed ripple peak and the ripple factor of the shunt wound DC motor 10 in the present embodiment 3 to those in the traditional shunt wound DC motor is 1/26.7.

In other words, although the shunt wound DC motor 10 in the present embodiment 3 has basically the same mean of the torque as the traditional shunt wound DC motor, the peak value of the torque ripple peak and the ripple factor of the shunt wound DC motor 10 in the present embodiment 3 are only one ninth of the traditional shunt wound DC motor, thereby decreasing the peak value of the output torque ripple peak and the ripple factor of the motor and further decreasing the peak value of the output rotation speed ripple and the ripple factor of the motor. The rotation speed ripple factor of the shunt wound DC motor in the present embodiment 2 is only 1/26 that of the traditional shunt wound DC motor. Finally, purposes of decreasing electromagnetic interference, vibration and noise of the motor and increasing the performances of the shunt wound DC motor and the driving device are achieved.

Variation Example 3

In the present variation example 3, with respect to the same structure as embodiment 1, the same symbol is given, and the same description is omitted.

Figure 19:
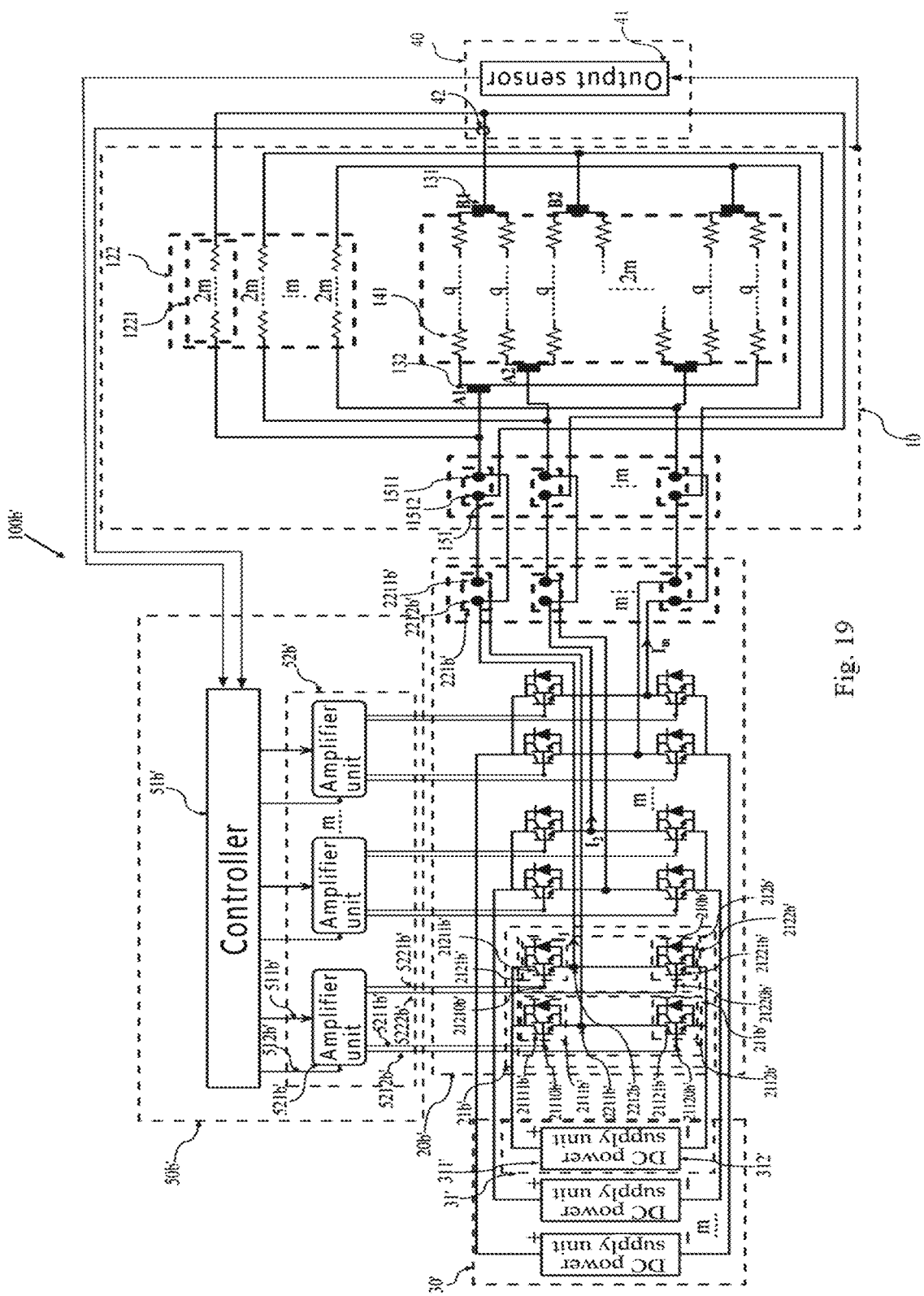
FIG. 19 is a schematic diagram of circuit connection of a shunt wound DC motor driving device in variation example 3 of the present invention.

FIG. 19 is a schematic diagram of circuit connection of a shunt wound DC motor driving device in variation example 3 of the present invention.

As shown in FIG. 19, a shunt wound DC motor driving device 100b' in the present variation example 3 includes a shunt wound DC motor 10, a chopper 20b', a DC power supply 30', a sensing part 40 and a control part 50b'.

As shown in FIG. 19, the chopper 20b' is composed of m chopping units 21b' that respectively correspond to m pairs of electric brushes 13.

Each of the chopping units 21b' includes a first bridge arm 211b' and a second bridge arm 212b', and a first power output end 2211b' and a second power output end 2212b'.

Each first upper bridge arm 2111b' includes p power switch tubes 21111b' connected in a one-to-one correspondence manner in parallel, diodes 210b' in reverse parallel connection with the power switch tubes, and switching control ends 21110b'; each first lower bridge arm 2112b' includes p power switch tubes 21121' connected in a one-to-one correspondence manner in parallel, diodes 210b' in reverse parallel connection with the power switch tubes, and switching control ends 21120b'; each second upper bridge arm 2121b' includes p power switch tubes 21211b' connected in a one-to-one correspondence manner in parallel, diodes 210b' in reverse parallel connection with the power switch tubes, and switching control ends 21210b'; and each second lower bridge arm 2122b' includes p power switch tubes 21221b' connected in a one-to-one correspondence manner in parallel, diodes 210b' in reverse parallel connection with the power switch tubes, and switching control ends 21220b', wherein p is a positive integer of being not greater than 2. Each of the power switch tubes is provided with a control pole; all the control poles in each first upper bridge arm 2111b' form the first upper bridge arm switching control ends 21110b'; all the control poles in each first lower bridge arm 2112b' form the first lower bridge arm switching control ends 21120b'; all the control poles in each second upper bridge arm 2121b' form the second upper bridge arm switching control ends 21210b'; and all the control poles in each second lower bridge arm 2122b' form the second lower bridge arm switching control ends 21220b'.

When the power switch tubes 21111b' of all the first upper bridge arms 2111b', the power switch tubes 21121b' of all the first lower bridge arms 2112b', the power switch tubes 21211b' of all the second upper bridge arms 2111b' and the power switch tubes 21221b' of all the second lower bridge arms 2122b' have the same maximum output current $I_1$, and the maximum current of the shunt wound DC motor 10 is $I_{max}$, the m meets the following condition: $m > I_{max} \div (k \times p \times I_1)$, wherein k is a parallel connection coefficient, and $1/p < k < 1$.

In the present variation example 3, the p is equal to 2-4; the parallel connection technology is mature and reliable; the quantity of the m can be properly decreased; workloads and complexity in production and manufacture are decreased; and cost performance of the product is increased.

The first power output end 2211b' is arranged between the first upper bridge arm 2111b' and the first lower bridge arm 2112b'; and the second power output end 2212b' is arranged between the second upper bridge arm 2121b' and the second lower bridge arm 2122b'. The m first power output ends 2211b' of all the chopping units 21b' and the m second power output ends 2212b' of all the chopping units 21b' respectively correspondingly form m pairs of power output terminals 221b'. The m pairs of power output terminals 221b' are connected with the m pairs of external wiring terminals 151 in a one-to-one correspondence manner.

As shown in FIG. 19, the DC power supply 30' is provided with m mutually independent DC power supply units 31' and m pairs of power supply output terminals led out of each of the DC power supply units 31'. The m pairs of power supply output terminals are connected with the m chopping units 21b' in a one-to-one correspondence manner Each pair of the power supply output terminals includes a positive pole 311' and a negative pole 312'. The positive pole 311' is connected with the first upper bridge arm 2111b' and the second upper bridge arm 2121b' in the corresponding chopping unit 21'; and the negative pole 312' is connected with the first lower bridge arm 2112b' and the second lower bridge arm 2122b' in the corresponding chopping unit 21'.

As shown in FIG. 19, the control part 50b' includes a controller 51b' and an amplifier 52b'.

The controller 51b' calculates generation according to the external instruction signal and the output feedback signal and the current feedback signal of the sensing part 40 and outputs a control signal 511b' and an enable signal 512b' to the amplifier 52b'. The control signal 511b' includes m unit control signals that respectively correspond to the m chopping units 21b' and are formed according to a preset phase stagger rule; each of the unit control signals includes four switching control signals 5211b', 5212b', 5221b' and 5222b' that correspond to four switching control ends 21110b', 21120b', 21210b' and 21220b' in the corresponding chopping units 21b'; and the enable signal 512b' is used for controlling an operating state of the amplifier 52b'.

The amplifier 52b' enters the operating state under control of the enable signal 512b', amplifies the four switching control signals in each of the unit control signals and correspondingly provides the four switching control signals for the four switching control ends 21110b', 21120b', 21210b' and 21220b'. The amplifier 52b' is provided with m amplified signal output parts that correspond to the m chopping units 21b'. Each of the amplified signal output parts is composed of four amplified signal output ends 5211b', 5212b', 5221b' and 5222b'. The four amplified signal output ends 5211b', 5212b', 5221b' and 5222b' of each of the amplified signal output parts are correspondingly connected with the four switching control ends 21110b', 21120b', 21210b' and 21220b' in the corresponding chopping units 21b', i.e., the amplified signal output end 5211b' is connected with the first upper bridge arm switching control end 21110b'; the amplified signal output end 5212b' is connected with the first lower bridge arm switching control end 21120b'; the amplified signal output end 5221b' is connected with the second upper bridge arm switching control end 21210*b'*; and the amplified signal output end 5222*b'* is connected with the second lower bridge arm switching control end 21220*b'*.

Actions and Effects of the Embodiments

According to the shunt wound DC motor driving device and the electrical equipment including the shunt wound DC motor driving device involved in the present embodiments 1-3, the chopper is provided with the m chopping units; each of the chopping units is provided with the first power output end, the second power output end and the w switching control ends; the control signal includes m unit control signals that respectively correspond to the m chopping units and are formed according to a preset phase stagger rule; each of the unit control signals includes w switching control signals that correspond to the w switching control ends in the corresponding chopping units; the w switching control ends are used for correspondingly receiving the w switching control signals; and m first power output ends of all the chopping units and m second power output ends of all the chopping units respectively correspondingly form m pairs of power output terminals. The exciting winding part includes m exciting winding units. Each of the exciting winding units is formed by respectively making exciting coils from insulated conductor strips composed of metal wires coated with insulating layers on at least one pair of corresponding main poles. The insulated conductor strip in each of the exciting winding units is provided with one end and the other end. The m ends of all the insulated conductor strips are electrically connected with m S-pole corresponding electric brushes in all the electric brushes to form the m first wiring terminals; meanwhile, the m other ends of all the insulated conductor strips are electrically connected with m N-pole corresponding electric brushes in all the electric brushes to form the m second wiring terminals; or, the m ends of all the insulated conductor strips are electrically connected with m N-pole corresponding electric brushes in all the electric brushes to form the m first wiring terminals; and meanwhile, the m other ends of all the insulated conductor strips are electrically connected with m S-pole corresponding electric brushes in all the electric brushes to form the m second wiring terminals. The m first wiring terminals and the m second wiring terminals respectively correspondingly form m pairs of external wiring terminals; and the m pairs of external wiring terminals are connected with m pairs of power output terminals in a one-to-one correspondence manner. In other words, each pair of the external wiring terminals is connected with one exciting winding unit and a pair of electric brushes in mutual series-shunt connection. Therefore, a branch circuit composed of each exciting winding unit and the pair of electric brushes in corresponding connection is mutually independent; current of each branch circuit is also independent; each branch circuit can independently work, and power of each branch circuit is independently provided by one pair of corresponding power output terminals, i.e., each pair of the power output terminals only undertakes operating current of one branch circuit, wherein the operating current is only 1/m of rated input current of the motor. Therefore, even for the motor having extremely large rated input current, as long as the m is greater enough, the operating current of each branch circuit or output current of each pair of the power output terminals will be corresponding decreased, so that according to the low enough output current of the power output terminals, requirements on the high-power high-performance motor can be met without adopting a parallel current evenness technology but by using an ordinary power switch tube or a power module. Moreover, cost of the chopper is decreased; requirements of connecting wires and connectors between the external wiring terminals and the power output terminals on contact resistance and insulation are lowered; production and manufacture difficulty is lowered; and reliability and safety of the system are increased.

Moreover, since the control signal includes the m switching control signals that respectively correspond to the m chopping units and are formed according to the preset phase stagger rule, current ripple phases of each pair of the power output terminals are mutually different. Therefore, the peak values of ripple peaks of the m superposed current ripples are decreased; peak values of ripple peaks of the output torque and the rotation speed are further decreased; the performance of the shunt wound DC motor is increased; and service life of the motor is prolonged.

To sum up, the shunt wound DC motor driving device in the present invention is simple in structure, short in connecting wire, simple in production process, easy to manufacture, convenient to maintain and low in production cost and maintenance cost, and has the advantages of reasonable structural design, simplicity and high reliability and safety. Therefore, the shunt wound DC motor driving device in the present invention can be applied to heavy-load electrical equipment such as electric cars, electric trucks, track cars, sightseeing tourist cars, trucks and ships, and can be further applied to high-performance electrical equipment such as numerically-controlled machine tools and submarines.

In addition, since the insulated conductors in each of the exciting winding units are formed on the m pairs of main poles, when the electric brushes, the exciting winding units and the connecting wires in the motor fail, only the parts at which failures are located shall be masked, and the other normal parts may still work. Thus, a phenomenon that the traditional shunt wound DC motor is suddenly out of control can be avoided; and the reliability and safety of the system are increased.

Moreover, since the upper bridge arm includes one power switch tube and the lower bridge arm includes one diode in the embodiment 1, the upper bridge arm and the lower bridge arm only include one power switch tube and the diode in reverse parallel connection with the power switch tube in the embodiment 2, and each of the first upper bridge arm, the first lower bridge arm, the second upper bridge arm and the second lower bridge arm only includes one power switch tube and the diode in reverse parallel connection with the power switch tube in the embodiment 3, the chopper in the Embodiments 1-3 is simple in structure, reliable, high in safety, easy to control and low in cost.

In addition, since the upper bridge arm in the variation example 1 includes the p power switch tubes connected in parallel in a one-to-one correspondence manner, the upper bridge arm and the lower bridge arm in the variation example 2 includes the p power switch tubes connected in parallel in a one-to-one correspondence manner, each of the first upper bridge arm, the first lower bridge arm, the second upper bridge arm and the second lower bridge arm in the variation example 3 includes the p power switch tubes connected in parallel in a one-to-one correspondence manner, wherein p is a positive integer of being not less than 2, the output current of each of the chopping units can be increased to a certain degree due to a relatively reliable and stable technology under a condition that the rated current of the motor is constant, relative to a condition that p is equal to 1, particularly a condition that the p is equal to 2-4. Thus, the numerical value of the m can be correspondingly decreased. The number of the electric brushes can be decreased; the number of power lines of the motor and the number of output lines of the chopping units are decreased; repair and maintenance difficulty is lowered; and production cost is properly decreased. Moreover, a heat radiating area can be enlarged; temperature rise is decreased; the reliability is increased; and the service life is prolonged.

Moreover, since the DC power supply in the variation examples 1-3 is provided with the m mutually independent DC power supply units, and one pair of power supply output terminals is led out of each of the DC power supply units, when the power supply output terminals or connecting wires of a certain DC power supply unit fail, only the parts at which failures are located shall be masked, and the other normal parts may still work. Thus, the phenomenon that the traditional shunt wound DC motor is suddenly out of control in case of failure can be avoided; and the reliability and safety of the system are increased. Moreover, the shunt wound DC motor can output a larger effective torque so as to be maintained in the operating state. Further, in the power supply aspect, a single high-capacity DC power supply is replaced with a plurality of independent DC power supply units with relatively low capacities. Compared with a traditional banked battery, the independent DC power supply units decrease overall performance attenuation of the power supply caused by parallel connection under a condition that the number of the power supply units is the same, increase the energy density, power, performance, durability and safety, and may well ensure endurance and performance of the electrical equipment.

In addition, since the amplifier in the variation examples 1-3 is composed of the m mutually independent amplifier units, and each of the amplifier units is correspondingly connected with one chopping unit, one exciting winding unit and one pair of electric brushes, when any one of the amplifier units, chopping units, electric brushes and exciting windings fails, after the shunt wound DC motor driving device in the present invention calculates the current value detected by a current sensor and judges the failed amplifier units, chopping units, electric brushes and exciting windings, the control part outputs the enable signal to enable the corresponding amplifier unit to stopping working, so that the damaged amplifier units, chopping units, electric brushes and exciting windings are masked and isolated, thereby avoiding further expansion of the failure, ensuring that the electrical driving device and the electrical equipment can continuously normally work or operate under a light load, and greatly decreasing the safety incident probability of the electrical equipment, particularly electrical equipment operating at a high speed.

The above embodiments are preferred cases of the present invention, rather than limiting the protection scope of the present invention.

For example, in the above embodiments, the exciting winding units in the shunt wound DC motor are formed by respectively making the exciting coils from the insulated conductor strips on the m pairs of main poles. However, the exciting winding units may also be formed by respectively making the exciting coils from the insulated conductor strips on one pair of main poles. The device is described below by taking variation of the exciting winding part in the embodiment 1 as an example.

Figure 20:
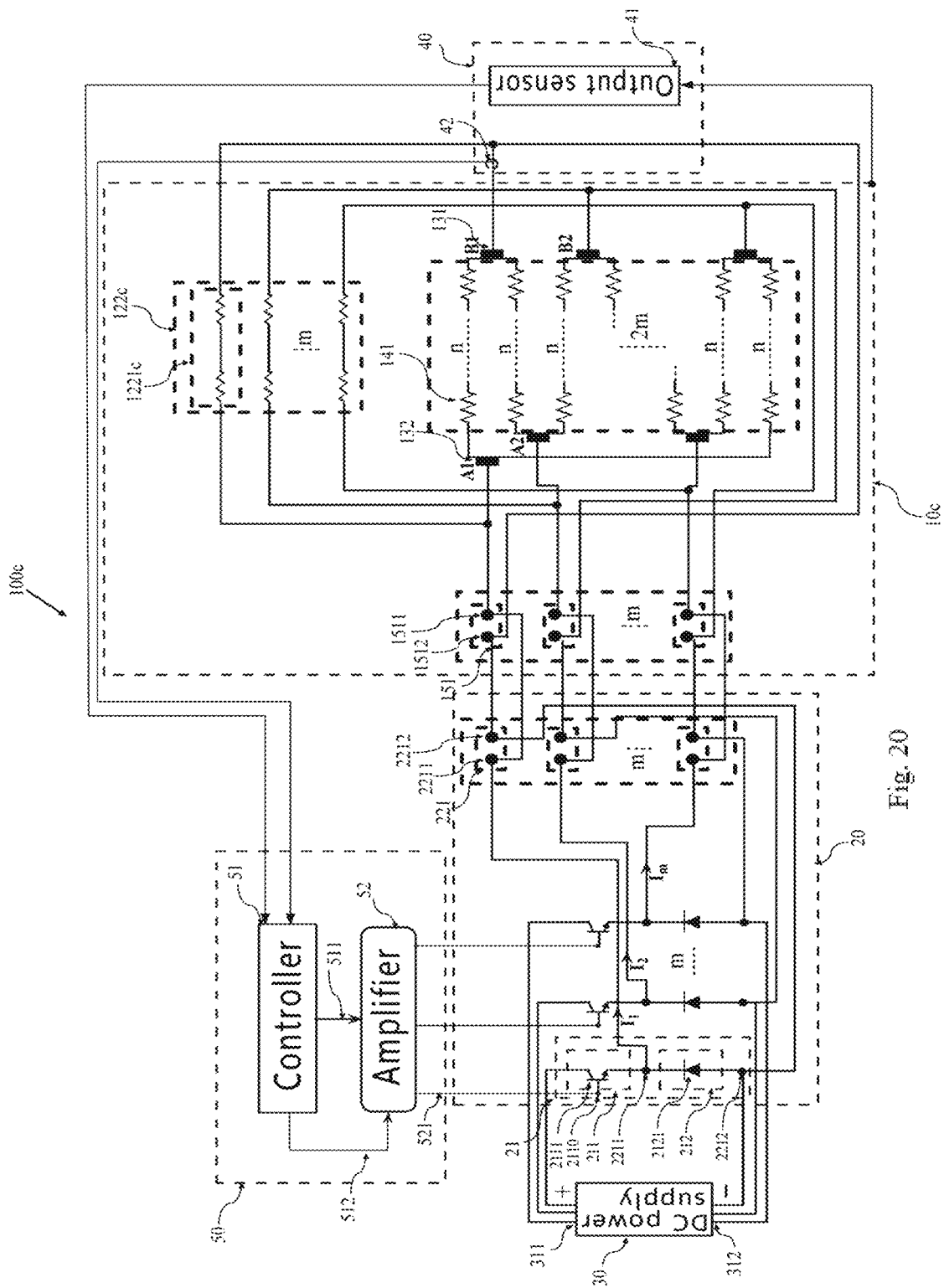
FIG. 20 is a schematic diagram of circuit connection of a shunt wound DC motor driving device in variation examples of the present invention.
Figure 21:
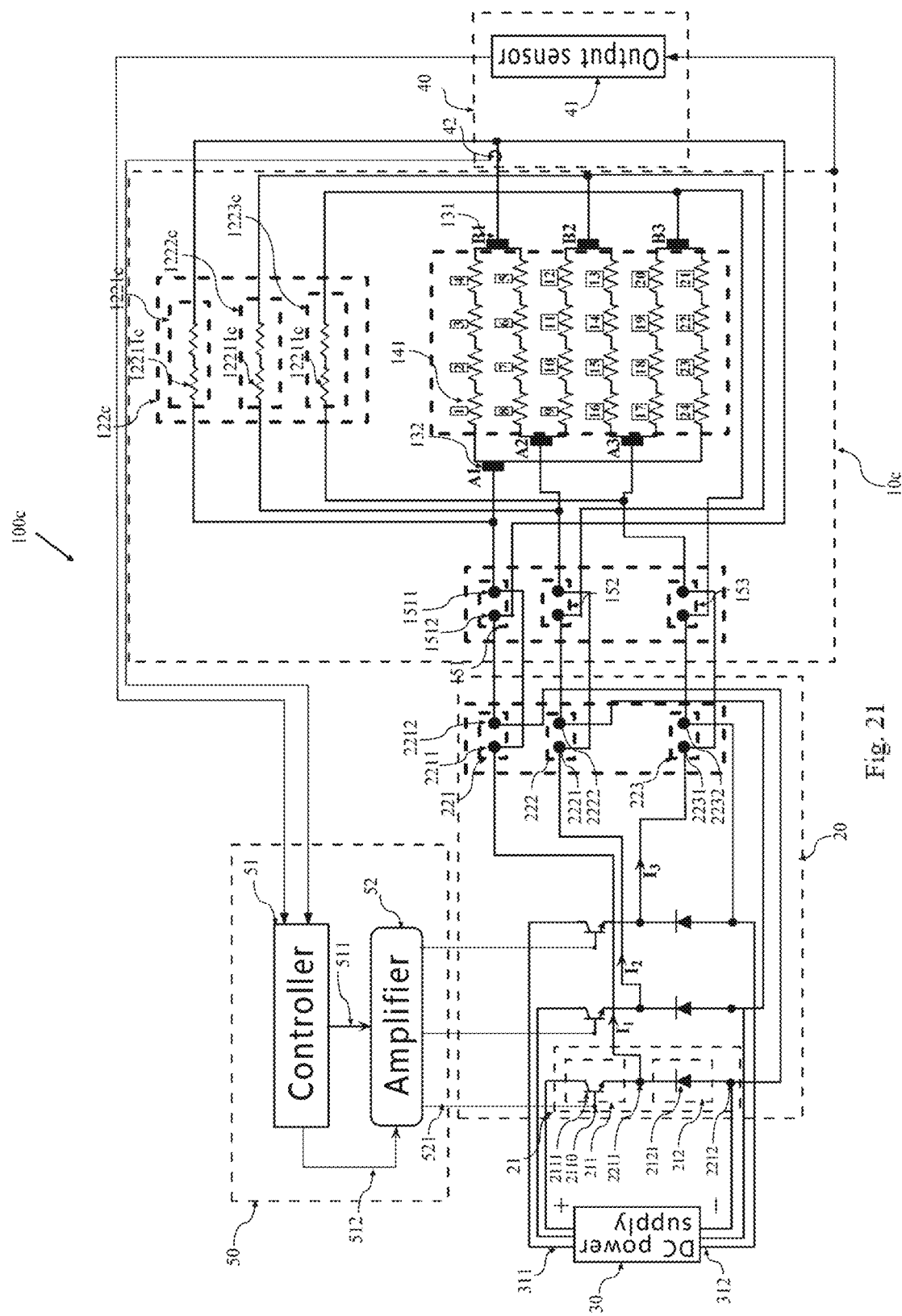
FIG. 21 is a schematic diagram of circuit connection of a shunt wound DC motor driving device in variation examples of the present invention when m is equal to 3.

FIG. 20 is a schematic diagram of circuit connection of the shunt wound DC motor driving device in the variation examples of the present invention; FIG. 21 is a schematic diagram of circuit connection of the shunt wound DC motor driving device in variation examples of the present invention when m is equal to 3; and FIG. 22 is a schematic diagram of circuit connection of a transverse section of the shunt wound DC motor in variation examples of the present invention.

Figure 22:
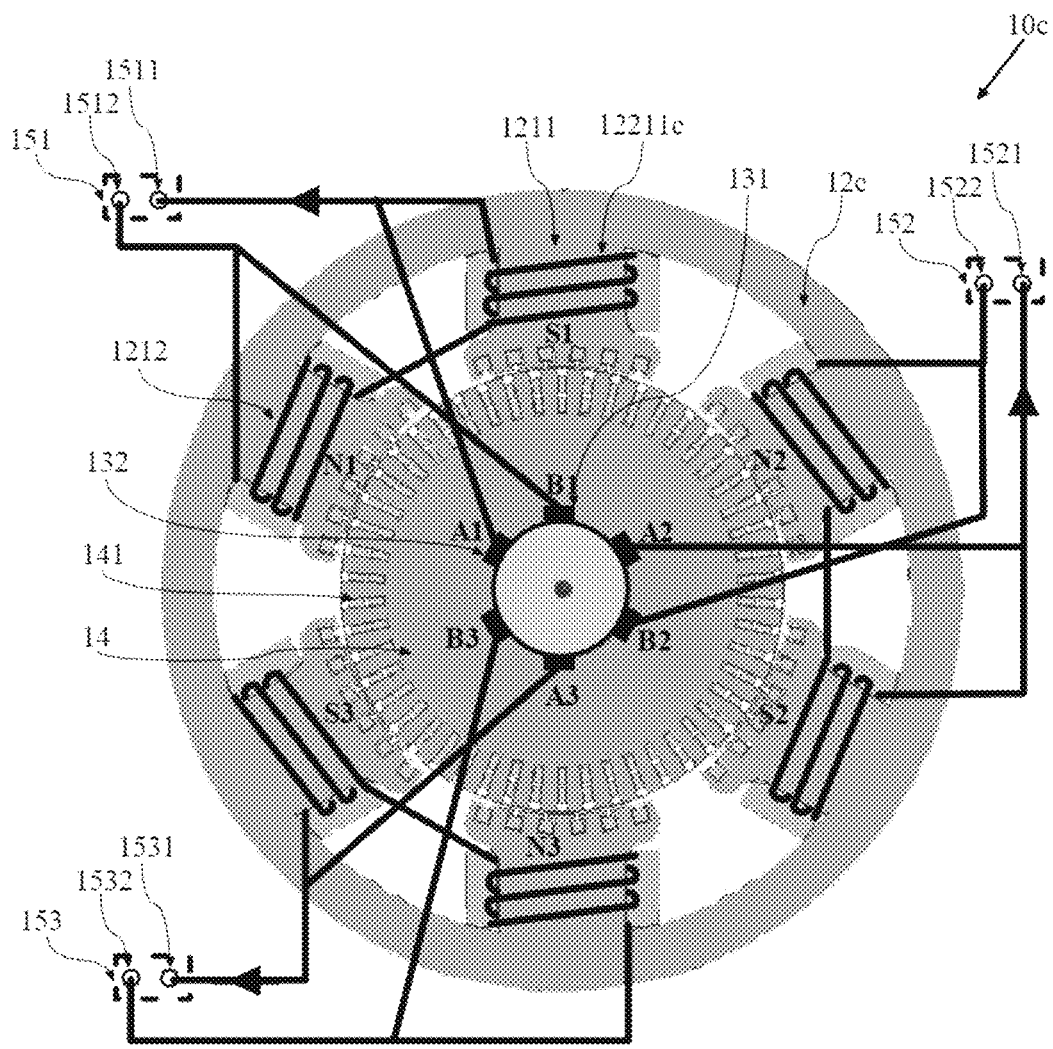
FIG. 22 is a schematic diagram of circuit connection of a transverse section of a shunt wound DC motor in variation examples of the present invention.

As shown in FIGS. 20-22, a stator 12c in a shunt wound DC motor driving device 100c includes m pairs of main poles 121 and further includes an exciting winding part 122c.

Each of the main poles 121 includes an S-polarity main pole 1211 and an N-polarity main pole 1212. Two adjacent main poles 121 have the opposite polarity in all the main poles 121.

The exciting winding part 122c includes m exciting winding units 1221c. The m exciting winding units 1221c respectively correspond to the m pairs of main poles 121. Each of the exciting winding units 1221c is formed by respectively making exciting coils 12211c from the insulated conductor strips composed of metal wires coated with insulating layers on one corresponding pair of main poles 121. The insulated conductor strip is any one of enameled wire and insulated copper conducting bar. In the present invention, the insulated conductor strips are the enameled wires. The exciting coils 12211c on each of the main poles 121 have the same number of turns, so that the motor is uniform in magnetic field during normal operation and has a constant moment.

The insulated conductor strip in each of the exciting winding units 1221c is provided with one end and the other end that are distinguished along a preset current direction of the exciting coils 12211c. The S-polarity main pole 1211 and the N-polarity main pole 1212 in each pair of the main poles 121 correspond to the winding directions of the exciting coils 12211c and the preset current direction of the exciting coils 12211c. The exciting coils 12211c of two adjacent main poles 121 have opposite current surrounding directions.

In each of the exciting winding units 1221c, the connection relationship of the two exciting coils 12211c is any one of the series connection and parallel connection; and the two exciting coils 12211c in each of the exciting winding units 1221c have the same connection relationship. In the present embodiment 4, a connection relationship of the two exciting coils 12211c is series connection.

Each pair of the electric brushes 13 corresponds to the spatial positions of each corresponding pair of main poles 121, so that the maximum magnetic field intensity in the armature windings can be maintained when other non-corresponding exciting winding units fail. Therefore, the maximum moment can be produced.

Since the m exciting winding units respectively correspond to the m pairs of magnetic poles, and the insulated conductor strips in each of the exciting winding units are formed on one corresponding pair of main poles, when the electric brushes, exciting winding units and connecting wires in the motor fail, only the parts at which failures are located shall be masked, and the other normal parts may still work. Moreover, the magnetic field excited by the exciting winding units at the non-failed part mainly acts on an armature winding branch circuit connected with the corresponding electric brushes, so that a phenomenon that the traditional shunt wound DC motor is suddenly out of control in case of failure can be avoided; and the reliability and safety of the system are increased. Further, the shunt wound DC motor can output a larger effective torque in failure so as to be maintained in the operating state.

Further, the lower bridge arm in the embodiment 1 and the variation example 1 includes 1 fly-wheel diode; each of the upper bridge arm and the lower bridge arm in the embodiment 2 and the variation example 2 includes a diode in reverse parallel connection with the power switch tube; and each of the first upper bridge arm, the first lower bridge arm, the second upper bridge arm and the second lower bridge arm in the embodiment 3 and the variation example 3 includes a diode in reverse parallel connection with the power switch tube. However, in the present invention, the corresponding upper bridge arms, lower bridge arms, first upper bridge arms, first lower bridge arms, second upper bridge arms and second lower bridge arms may also include a plurality of fly-wheel diodes connected in parallel in a one-to-one correspondence manner Under the circumstances, when any one of the fly-wheel diodes fails, the other diodes may also normally work, thereby increasing the reliability and safety of the system.

Moreover, in the Embodiments 1-3, if the shunt wound DC motor driving system in the present invention needs to normally work, the amplifier must be in an operating mode. Therefore, the enable signal may not be applied to the amplifier.

Moreover, on an occasion that the requirements on the armature current, the rotation speed and the torque are high during steady-state operation of the shunt wound DC motor, the m may be set according to the peak values of the corresponding armature current, the rotation speed and torque ripple peaks and the ripple factor.

Further, the upper bridge arm and the lower bridge arm in the embodiment 2 and the variation example 2 and the first upper bridge arm, the first lower bridge arm, the second upper bridge arm and the second lower bridge arm in the embodiment 3 and the variation example 3 may also be power switching devices; and the power switching devices are equivalent to the power switch tubes and the diodes in reverse parallel connection with the power switch tubes.

The invention claimed is:

1. A shunt wound DC motor driving device, characterized by comprising:
a shunt wound DC motor having a rated voltage;
a DC power supply having a constant voltage that corresponds to the rated voltage; and
a chopper that converts the constant voltage into a variable voltage based on a control signal and provides the variable voltage for the shunt wound DC motor,
wherein the chopper is provided with m chopping units;
each of the chopping units is provided with a first power output end, a second power output end and w switching control ends;
the control signal comprises m unit control signals that respectively correspond to the m chopping units and are formed according to a preset phase stagger rule;
each of the unit control signals comprises w switching control signals that correspond to the w switching control ends in the corresponding chopping units;
the w switching control ends are used for correspondingly receiving the w switching control signals;
m first power output ends of all the chopping units and m second power output ends of all the chopping units respectively correspondingly form m pairs of power output terminals;
the shunt wound DC motor comprises:
a casing;
m pairs of electric brushes fixed in the casing;
a stator, arranged in the casing and comprising m pairs of main poles corresponding to the m pairs of electric brushes and further comprising an exciting winding part; and
a rotor that is arranged in the stator and comprises a plurality of armature windings connected in a one-to-one correspondence manner in a preset connection manner;
each pair of the main poles comprises an S-polarity main pole and an N-polarity main pole;
two adjacent main poles have different polarities;
two electric brushes in each pair of electric brushes have adjacent positions;
each pair of the electric brushes comprises an S-pole corresponding electric brush that corresponds to the S-polarity main pole and an N-pole corresponding electric brush that corresponds to the N-polarity main pole;
the exciting winding part comprises m exciting winding units;
each of the exciting winding units is formed by respectively making exciting coils from insulated conductor strips composed of metal wires coated with insulating layers on at least one pair of main poles;
the insulated conductor strip in each of the exciting winding units is provided with one end and the other end;
the m ends of all the insulated conductor strips are electrically connected with m S-pole corresponding electric brushes in all the electric brushes to form m first wiring terminals; meanwhile, the m other ends of all the insulated conductor strips are electrically connected with m N-pole corresponding electric brushes in all the electric brushes to form m second wiring terminals; or the m ends of all the insulated conductor strips are electrically connected with m N-pole corresponding electric brushes in all the electric brushes to form m first wiring terminals; meanwhile, the m other ends of all the insulated conductor strips are electrically connected with m S-pole corresponding electric brushes in all the electric brushes to form m second wiring terminals;
the m first wiring terminals and the m second wiring terminals respectively correspondingly form m pairs of external wiring terminals;
the m pair of external wiring terminals are connected with the m pairs of power output terminals in a one-to-one correspondence manner;
m is a positive integer of being not less than 2; and w is 1, 2 or 4.

2. The shunt wound DC motor driving device according to claim 1, characterized in that,
wherein w is equal to 1;
each of the chopping units is further provided with an upper bridge arm and a lower bridge arm connected in series with each other;
the upper bridge arm is connected with a positive pole of the DC power supply; the lower bridge arm is connected with a negative pole of the DC power supply;
the upper bridge arm comprises at least one power switch tube and one switching control end;
each power switch tube is provided with a control pole;
the switching control end is formed based on the control pole;
the lower bridge arm comprises at least one diode;
the first power output end is arranged between the upper bridge arm and the lower bridge arm; and the second power output end is arranged at the connection end of the lower bridge arm and the DC power supply.

3. The shunt wound DC motor driving device according to claim 2, characterized in that, wherein the preset phase stagger rule is that phases of the w switching control signals are respectively staggered by 1/m switching cycle in sequence; or, m is an even number; and the preset phase stagger rule is that the phases of the w switching control signals are respectively staggered by 2/m switching cycle in sequence.

4. The shunt wound DC motor driving device according to claim 1, characterized in that, wherein w is equal to 2;

each of the chopping units is further provided with an upper bridge arm and a lower bridge arm connected in series with each other;

the upper bridge arm is connected with a positive pole of the DC power supply; the lower bridge arm is connected with a negative pole of the DC power supply;

the upper bridge arm and the lower bridge arm respectively comprise at least one power switch tube, at least one diode in reverse parallel connection with the power switch tube, and one switching control end;

each power switch tube is provided with a control pole;

the switching control end is formed based on the control pole;

the switching control end in the upper bridge arm serves as an upper bridge arm switching control end, and the switching control end in the lower bridge arm serves as a lower bridge arm switching control end, used for correspondingly receiving two switching control signals; and the first power output end is arranged between the upper bridge arm and the lower bridge arm; and the second power output end is arranged at the connection end of the lower bridge arm and the DC power supply.

5. The shunt wound DC motor driving device according to claim 4, characterized in that, wherein: m is an odd number; the preset phase stagger rule is as follows: m phases that respectively correspond to the m unit control signals serving as m preset phases are staggered by 1/m switching cycle in sequence;

in each of the chopping units, the switching control signal that corresponds to the upper bridge arm switching control end is set as a reference switching control signal; a phase of the reference switching control signal is set according to a preset phase corresponding to the control signal; a switching control signal that corresponds to the lower bridge arm switching control end is set reciprocal to the reference switching control signal; or, m is an even number;

the preset phase stagger rule is as follows: the m phases that respectively correspond to the m unit control signals serving as m preset phases are staggered by 2/m switching cycle in sequence; and in each of the chopping units, the switching control signal that corresponds to the upper bridge arm switching control end is set as the reference switching control signal; the phase of the reference switching control signal is set according to the preset phase corresponding to the unit control signal; and a switching control signal that corresponds to the lower bridge arm switching control end is set reciprocal to the reference switching control signal.

6. The shunt wound DC motor driving device according to claim 1, characterized in that, wherein w is equal to 4;

each of the chopping units is further provided with a first bridge arm and a second bridge arm connected in parallel with each other;

the first bridge arm comprises a first upper bridge arm and a first lower bridge arm connected in series with each other; the second bridge arm comprises a second upper bridge arm and a second lower bridge arm connected in series with each other;

the first upper bridge arm and the second upper bridge arm are connected with the positive pole of the DC power supply; the first lower bridge arm and the second lower bridge arm are connected with the negative pole of the DC power supply;

the first upper bridge arm, the first lower bridge arm, the second upper bridge arm and the second lower bridge arm respectively comprise at least one power switch tube, at least one diode in reverse parallel connection with the power switch tube, and one switching control end;

each power switch tube is provided with a control pole;

the switching control end is formed based on the control pole;

the switching control end in the first upper bridge arm serves as a first upper bridge arm switching control end, the switching control end in the first lower bridge arm serves as a first lower bridge arm switching control end, the switching control end in the second upper bridge arm serves as a second upper bridge arm switching control end, and the switching control end in the second lower bridge arm serves as a second lower bridge arm switching control end, used for correspondingly receiving four switching control signals;

the first power output end is arranged between the first upper bridge arm and the first lower bridge arm; and the second power output end is arranged between the second upper bridge arm and the second lower bridge arm.

7. The shunt wound DC motor driving device according to claim 6, characterized in that, wherein; m is an odd number; the preset phase stagger rule is as follows: m phases that respectively correspond to the m unit control signals serving as m preset phases are staggered by 1/m switching cycle in sequence;

in each of the chopping units, two switching control signals that correspond to the first upper bridge arm switching control end and the second lower bridge arm switching control end are set as reference switching control signals; phases of the reference switching control signals are set according to preset phases that correspond to the unit control signals; two switching control signals that correspond to the first lower bridge arm switching control end and the second upper bridge arm switching control end are set reciprocal to the reference switching control signals; or, m is an even number;

the preset phase stagger rule is as follows: m phases that respectively correspond to the m unit control signals serving as m preset phases are staggered by 2/m switching cycle in sequence;

in each of the chopping units, the two switching control signals that correspond to the first upper bridge arm switching control end and the second lower bridge arm switching control end are set as the reference switching control signals; the phases of the reference switching control signals are set according to preset phases that correspond to the unit control signals; and two switching control signals that correspond to the first lower bridge arm switching control end and the second upper bridge arm switching control end are set reciprocal to the reference switching control signals.

8. The shunt wound DC motor driving device according to claim 1, characterized in that,
wherein the DC power supply is provided with m pairs of power supply output terminals that are respectively connected with the m chopping units.

9. The shunt wound DC motor driving device according to claim 8, characterized in that,
wherein the DC power supply is composed of m mutually independent DC power units; and each of the DC power units is provided with one pair of power supply output terminals.

10. The shunt wound DC motor driving device according to claim 1, characterized by further comprising:
a control part comprising a controller and an amplifier,
wherein the controller generates m unit control signals according to the preset phase stagger rule; and
the amplifier amplifies w switching control signals in each of the unit control signals and provides the w amplified switching control signals for the w switching control ends in the corresponding chopping units.

11. The shunt wound DC motor driving device according to claim 10, characterized in that,
wherein w is equal to 1;
the amplifier is composed of m mutually independent amplifier units; the m amplifier units respectively correspond to the m chopping units; and
each of the amplifier units is provided with an amplified signal output end in corresponding connection with the switching control end.

12. The shunt wound DC motor driving device according to claim 10, characterized in that,
wherein w is equal to 2 or 4;
the amplifier is composed of m mutually independent amplifier units; the m amplifier units respectively correspond to the m chopping units;
each of the amplifier units is provided with an amplified signal output part; and the amplified signal output parts are composed of w amplified signal output ends.

13. The shunt wound DC motor driving device according to claim 10, characterized in that,
the amplifier is composed of m mutually independent amplifier units; and
wherein the controller further generates m enable signals that respectively correspond to the m amplifier units; and each of the enable signals is used for controlling an operating state of a corresponding amplifier unit.

14. The shunt wound DC motor driving device according to claim 1, characterized in that,
wherein the m exciting winding units respectively correspond to the m pairs of main poles; and
the insulated conductor strip in each of the exciting winding units is formed on one corresponding pair of main poles.

15. The shunt wound DC motor driving device according to claim 14, characterized in that,
wherein the exciting coils on the various main poles have the same number of turns;
each pair of the main poles corresponds to spatial locations of one corresponding pair of electric brushes;
in each of the exciting winding units, a connection relationship of two exciting coils is any one of series connection and parallel connection; and
the connection relationship of two exciting coils in each exciting winding unit is the same.

16. The shunt wound DC motor driving device according to claim 1, characterized in that,
wherein the insulated conductor strips in each of the exciting winding units are formed on the m pairs of main poles.

17. The shunt wound DC motor driving device according to claim 16, characterized in that,
wherein the m exciting coils on the various main poles have the same winding direction and the same number of turns;
in each of the exciting winding units, a connection relationship of 2m exciting coils is any one of series connection, parallel connection and series-parallel connection; and
the connection relationship of the 2m exciting coils is the same in each of the exciting winding units.

18. The shunt wound DC motor driving device according to claim 1, characterized in that,
wherein the preset connection manner is any one of single lap, multiplex lap and compound ripple.

19. An electrical equipment, characterized by comprising:
a shunt wound DC motor driving device,
wherein the shunt wound DC motor driving device is the shunt wound DC motor driving device of claim 1.

20. The electrical equipment according to claim 19, characterized in that,
wherein the electrical equipment is any one of a rolling mill, an electric locomotive, a large machine tool spindle transmission system and a ship.

* * * * *